(12) United States Patent
Maloney

(10) Patent No.: US 8,595,778 B2
(45) Date of Patent: Nov. 26, 2013

(54) USER AUTHENTICATION IN A CONTENT DELIVERY NETWORK

(75) Inventor: Ian Maloney, Dublin (IE)

(73) Assignee: Level 3 Communications, LLC, Broomsfield, CO (US)

(*) Notice: Subject to any disclaimer, the term of this patent is extended or adjusted under 35 U.S.C. 154(b) by 949 days.

(21) Appl. No.: 12/604,678

(22) Filed: Oct. 23, 2009

(65) Prior Publication Data

US 2010/0122303 A1 May 13, 2010

Related U.S. Application Data

(60) Provisional application No. 61/113,941, filed on Nov. 12, 2008.

(51) Int. Cl.
*H04N 7/173* (2011.01)

(52) U.S. Cl.
USPC .................................. 725/87; 725/91; 725/93

(58) Field of Classification Search
USPC ............................................... 725/87, 91, 93
See application file for complete search history.

(56) References Cited

U.S. PATENT DOCUMENTS

| | | | |
|---|---|---|---|
| 4,977,455 A | 12/1990 | Young | |
| 5,151,789 A | 9/1992 | Young | |
| 5,253,066 A | 10/1993 | Vogel | |
| 5,307,173 A | 4/1994 | Yuen et al. | |
| 5,335,079 A | 8/1994 | Yuen et al. | |
| 5,353,121 A | 10/1994 | Young et al. | |
| 5,382,983 A | 1/1995 | Kwoh et al. | |
| 5,457,776 A | 10/1995 | Wong et al. | |
| 5,479,266 A | 12/1995 | Young et al. | |
| 5,479,268 A | 12/1995 | Young et al. | |
| 5,499,103 A | 3/1996 | Mankovitz | |
| 5,512,963 A | 4/1996 | Mankovitz | |
| 5,515,173 A | 5/1996 | Mankovitz et al. | |
| 5,532,732 A | 7/1996 | Yuen et al. | |
| 5,532,754 A | 7/1996 | Young et al. | |
| 5,541,738 A | 7/1996 | Mankovitz | |
| 5,550,576 A | 8/1996 | Klosterman | |
| 5,553,123 A | 9/1996 | Chan et al. | |
| 5,559,550 A | 9/1996 | Mankovitz | |

(Continued)

FOREIGN PATENT DOCUMENTS

| FR | 2893731 | 5/2007 |
|---|---|---|
| KR | 1020040084932 A | 10/2004 |

OTHER PUBLICATIONS

U.S. Appl. No. 12/495,990, entitled "Flexible Token for Use in Content Delivery," filed Jul. 1, 2009 (Hopkins).

(Continued)

*Primary Examiner* — Kieu Oanh T Bui

(57) ABSTRACT

Embodiments generally disclosed herein include computer-implemented methods for delivery of video content across a network. Such methods comprise a content delivery manager capable of receiving a video stream from a content source for delivery to a end user of a content publisher. The content delivery manager is further capable of detecting a trigger signal within the video stream. For example, the trigger signal can indicate a temporal mark injected into the video stream by the content publisher. During general operation, the content delivery manager processes the trigger signal to determine whether to modify delivery of the video stream to the end user. According to another general embodiment, a computer-implemented method is provided for authorizing delivery of a video stream to an end user.

20 Claims, 22 Drawing Sheets

(56) References Cited

U.S. PATENT DOCUMENTS

| | | |
|---|---|---|
| 5,600,711 A | 2/1997 | Yuen |
| 5,619,274 A | 4/1997 | Roop et al. |
| 5,640,484 A | 6/1997 | Mankovitz |
| 5,654,886 A | 8/1997 | Zereski, Jr. et al. |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,727,159 A | 3/1998 | Kikinis |
| 5,734,786 A | 3/1998 | Mankovitz |
| 5,742,762 A | 4/1998 | Scholl et al. |
| 5,745,909 A | 4/1998 | Perlman et al. |
| 5,748,188 A | 5/1998 | Hu et al. |
| 5,790,198 A | 8/1998 | Roop et al. |
| 5,801,787 A | 9/1998 | Schein et al. |
| 5,805,815 A | 9/1998 | Hill |
| 5,808,608 A | 9/1998 | Young et al. |
| 5,809,204 A | 9/1998 | Young et al. |
| 5,812,205 A | 9/1998 | Milnes et al. |
| 5,822,324 A | 10/1998 | Kostresti et al. |
| 5,828,945 A | 10/1998 | Klosterman |
| 5,848,427 A | 12/1998 | Hyodo |
| 5,870,150 A | 2/1999 | Yuen |
| 5,883,661 A | 3/1999 | Hoarty |
| 5,886,746 A | 3/1999 | Yuen et al. |
| 5,901,286 A | 5/1999 | Danknick et al. |
| 5,903,816 A | 5/1999 | Broadwin et al. |
| 5,915,026 A | 6/1999 | Mankovitz |
| 5,918,013 A | 6/1999 | Mighdoll et al. |
| 5,918,014 A | 6/1999 | Robinson |
| 5,923,362 A | 7/1999 | Klosterman |
| 5,929,850 A | 7/1999 | Broadwin et al. |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,978,791 A | 11/1999 | Farber |
| 5,982,445 A | 11/1999 | Eyer et al. |
| 5,987,213 A | 11/1999 | Mankovitz et al. |
| 5,987,518 A | 11/1999 | Gotwald |
| 5,988,078 A | 11/1999 | Levine |
| 5,991,498 A | 11/1999 | Young |
| 5,996,025 A | 11/1999 | Day |
| 6,002,394 A | 12/1999 | Schein |
| 6,006,257 A | 12/1999 | Slezak |
| 6,016,141 A | 1/2000 | Knudson et al. |
| 6,028,599 A | 2/2000 | Yuen et al. |
| 6,034,689 A | 3/2000 | White et al. |
| 6,049,652 A | 4/2000 | Yuen et al. |
| 6,049,831 A | 4/2000 | Gardell |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,185,598 B1 | 2/2001 | Farber |
| 6,189,039 B1 | 2/2001 | Harvey |
| 6,195,680 B1 | 2/2001 | Goldszmidt |
| 6,216,265 B1 | 4/2001 | Roop et al. |
| 6,226,618 B1 | 5/2001 | Downs |
| 6,239,794 B1 | 5/2001 | Yuen et al. |
| 6,240,555 B1 | 5/2001 | Shoff et al. |
| 6,247,176 B1 | 6/2001 | Schein et al. |
| 6,262,722 B1 | 7/2001 | Allison et al. |
| 6,263,313 B1 | 7/2001 | Milsted |
| 6,263,501 B1 | 7/2001 | Schein et al. |
| 6,272,566 B1 | 8/2001 | Craft |
| 6,275,825 B1 | 8/2001 | Kobayashi et al. |
| 6,311,182 B1 | 10/2001 | Colbath |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,398,245 B1 | 6/2002 | Gruse |
| 6,405,188 B1 | 6/2002 | Schwartz |
| 6,412,110 B1 | 6/2002 | Schein et al. |
| 6,415,280 B1 | 7/2002 | Farber |
| 6,418,421 B1 | 7/2002 | Hurtado |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,082 B1 | 10/2002 | Lumelsky |
| 6,460,181 B1 | 10/2002 | Donnelly |
| 6,463,508 B1 | 10/2002 | Wolf |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,477,707 B1 * | 11/2002 | King et al. ............... 725/97 |
| 6,490,580 B1 | 12/2002 | Dey |
| 6,493,707 B1 | 12/2002 | Dey |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,587,837 B1 | 7/2003 | Spagna |
| 6,588,013 B1 | 7/2003 | Lumley et al. |
| 6,654,807 B2 | 11/2003 | Farber |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward, III et al. |
| 6,760,537 B2 | 7/2004 | Mankovitz |
| 6,763,377 B1 | 7/2004 | Belknap |
| 6,799,326 B2 | 9/2004 | Boylan, III et al. |
| 6,799,327 B1 | 9/2004 | Reynolds et al. |
| 6,850,693 B2 | 2/2005 | Young et al. |
| 6,859,791 B1 | 2/2005 | Spagna |
| 6,859,799 B1 | 2/2005 | Yuen |
| 6,862,264 B1 | 3/2005 | Moura et al. |
| 6,928,442 B2 | 8/2005 | Farber |
| 6,963,910 B1 | 11/2005 | Belknap |
| 6,965,890 B1 | 11/2005 | Dey |
| 7,039,633 B1 | 5/2006 | Dey |
| 7,039,935 B2 | 5/2006 | Knudson et al. |
| 7,054,935 B2 | 5/2006 | Farber |
| 7,069,576 B1 | 6/2006 | Knudson et al. |
| 7,103,564 B1 | 9/2006 | Ehnebuske |
| 7,110,984 B1 | 9/2006 | Spagna |
| 7,117,259 B1 | 10/2006 | Rohwer |
| 7,162,468 B2 | 1/2007 | Schwartz |
| 7,188,085 B2 | 3/2007 | Pelletier |
| 7,206,748 B1 | 4/2007 | Gruse |
| 7,404,010 B1 | 7/2008 | Gardell et al. |
| 7,487,529 B1 | 2/2009 | Orlick |
| 7,647,418 B2 * | 1/2010 | Ash et al. ............... 709/231 |
| 7,720,432 B1 | 5/2010 | Colby et al. |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward, III et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0063752 A1 | 4/2003 | Medvinsky et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |

(56) References Cited

U.S. PATENT DOCUMENTS

| | | |
|---|---|---|
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward, III et al. |
| 2004/0107437 A1 | 6/2004 | Reichardt et al. |
| 2004/0139097 A1 | 7/2004 | Farber |
| 2004/0168189 A1 | 8/2004 | Reynolds et al. |
| 2004/0194138 A1 | 9/2004 | Boylan, III et al. |
| 2004/0205811 A1 | 10/2004 | Grandy et al. |
| 2004/0261098 A1 | 12/2004 | Macrae et al. |
| 2005/0010949 A1 | 1/2005 | Ward et al. |
| 2005/0021202 A1 | 1/2005 | Russell et al. |
| 2005/0028201 A1 | 2/2005 | Klosterman et al. |
| 2005/0114296 A1 | 5/2005 | Farber |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0198334 A1 | 9/2005 | Farber |
| 2005/0216936 A1 | 9/2005 | Knudson et al. |
| 2005/0235307 A1 | 10/2005 | Relan et al. |
| 2005/0251824 A1 | 11/2005 | Thomas et al. |
| 2006/0015574 A1 | 1/2006 | Seed |
| 2006/0015892 A1 | 1/2006 | Hirt et al. |
| 2006/0156336 A1 | 7/2006 | Knudson et al. |
| 2006/0212894 A1 | 9/2006 | Knudson et al. |
| 2006/0218265 A1 | 9/2006 | Farber |
| 2006/0277574 A1 | 12/2006 | Schein et al. |
| 2006/0277576 A1 | 12/2006 | Acharya et al. |
| 2006/0288366 A1 | 12/2006 | Boylan, III et al. |
| 2007/0016926 A1 | 1/2007 | Ward, III et al. |
| 2007/0033613 A1 | 2/2007 | Ward, III et al. |
| 2007/0107010 A1 | 5/2007 | Jolna et al. |
| 2007/0179950 A1 | 8/2007 | Kester et al. |
| 2007/0233705 A1 | 10/2007 | Farber |
| 2007/0233706 A1 | 10/2007 | Farber |
| 2007/0233846 A1 | 10/2007 | Farber |
| 2007/0233884 A1 | 10/2007 | Farber |
| 2008/0065724 A1 | 3/2008 | Seed |
| 2008/0071855 A1 | 3/2008 | Farber |
| 2008/0071859 A1 | 3/2008 | Seed |
| 2008/0104268 A1 | 5/2008 | Farber |
| 2008/0104624 A1 | 5/2008 | Narasimhan et al. |
| 2008/0140800 A1 | 6/2008 | Farber |
| 2008/0201736 A1 | 8/2008 | Gordon et al. |
| 2008/0215735 A1 | 9/2008 | Farber |
| 2008/0215750 A1 | 9/2008 | Farber |
| 2008/0215755 A1 | 9/2008 | Farber |
| 2008/0263056 A1 | 10/2008 | Murray et al. |
| 2008/0263602 A1 | 10/2008 | Murray et al. |
| 2008/0275987 A1 | 11/2008 | Gardell et al. |
| 2009/0259611 A1 | 10/2009 | Wang |
| 2009/0282159 A1 | 11/2009 | Wang |
| 2010/0027974 A1 | 2/2010 | Ansari |
| 2011/0197237 A1* | 8/2011 | Turner ............ 725/78 |

OTHER PUBLICATIONS

International Search Report from WIPO, International Application No. PCT/US2009/061880, International Filing Date Oct. 23, 2009. Date of mailing ISR Jun. 15, 2010, 3 pages.

Written Opinion, International Application No. PCT/US2009/061880, International Filing Date Oct. 23, 2009. Date of mailing Written Opinion Jun. 15, 2010, 5 pages.

International Preliminary Report on Patentability, International Application No. PCT/US2009/061880, International Filing Date Oct. 23, 2009. Date of mailing Preliminary Report May 17, 2011, 1 page.

International Search Report from WIPO, International Application No. PCT/US2009/061908, International Filing Date Oct. 23, 2009. Date of mailing ISR May 19, 2010, 5 pages.

Written Opinion, International Application No. PCT/US2009/061908, International Filing Date Oct. 23, 2009. Date of mailing Written Opinion May 19, 2010, 5 pages.

International Preliminary Report on Patentability, International Application No. PCT/US2009/061908, International Filing Date Oct. 23, 2009. Date of mailing Preliminary Report May 17, 2011, 1 page.

European Extended Search Report, dated May 3, 2013, European Appl. No. 09826529.1, 8 pgs.

European Extended Search Report, mailed May 3, 2013, European Appl. No. 09826527.5, 7 pgs.

\* cited by examiner

USER AUTHENTICATION IN A CONTENT DELIVERY NETWORK

RELATED APPLICATIONS

This application claims the benefit of commonly owned U.S. Provisional Application No. 61/113,941, filed Nov. 12, 2008, entitled "Content Delivery Management and Administration", which is incorporated by reference in its entirety for all purposes. This application is related to concurrently-filed and commonly owned U.S. Non-Provisional Application Ser. No. 12/604,518, filed Oct. 23, 2009, entitled "Dynamic Processing of Streamed Content," which is incorporated by reference in its entirety for all purposes.

TECHNICAL FIELD

Embodiments presently disclosed generally relate to network communications. More specifically, embodiments herein relate to distributing and serving various media and content resources across a content delivery network.

BACKGROUND OF THE INVENTION

The Internet has enabled a proliferation of information to become available to end users across a myriad of different heterogeneous networks. Users of the Internet enjoy the ability to quickly access various types of multimedia (e.g., audio, video, games, etc.) for viewing and playback on their devices (e.g., PCs, laptops, mobile phones, etc.). Various streaming protocols and procedures are used to deliver multimedia in a real-time, or near-real time fashion, such that a user may interact with the media (e.g., watch a video) while the media is simultaneously being distributed over one or more networks.

All media is not freely available however. Many content providers and publishers wish to protect and/or monetize their media assets when providing such content over the Internet. For example, various digital rights management policies (e.g., encryption/decryption) have been established to protect media assets of content providers and publishers. Automated e-commerce technologies have also been deployed so that content providers and publishers can conveniently monetize the various media content being distributed to end users.

SUMMARY OF THE INVENTION

Embodiments generally disclosed herein include computer-implemented methods for delivery of video content across a network. Such methods comprise a content delivery manager capable of receiving a video stream from a content source for delivery to a client of a content publisher. According to an example configuration, the client subscribes to the content publisher to receive video content. The content delivery manager is capable of detecting a trigger signal within the video stream. For example, the trigger signal can indicate a temporal mark injected into the video stream by the content publisher.

During general operation, the content delivery manager processes the trigger signal to determine whether to modify delivery of the video stream to the client. If necessary, the content delivery manager modifies delivery of the video stream in accordance with the processing of the trigger signal.

According to another general embodiment, a computer-implemented method is provided for authorizing delivery of a video stream to an end user. As such, the video stream is associated with a content publisher. The method comprises an authorization manager capable of receiving a request from the end user for delivery of the video stream to the end user across a network.

In operation, the authorization manager queries a subscription database associated with the content publisher. In response to the query, the authorization manager processes a reply from the subscription database to determine whether the end user has authorization to receive delivery of the video stream.

According to one example embodiment, if it is determined (per the reply from the subscription database) that the end user is not authorized to receive delivery of the video stream from the content publisher, the authorization manager transmits a notification to the end user indicating that the end user is not authorized to receive delivery of the video stream based on the processing of the reply from the subscription database.

In another example embodiment, if it is determined (per the reply from the subscription database) that the end user is authorized to receive delivery of the video stream from the content publisher, the authorization manager initiates delivery of the video stream to the end user based on the processing of the reply from the subscription database.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

System Component Overview

Figure 1:
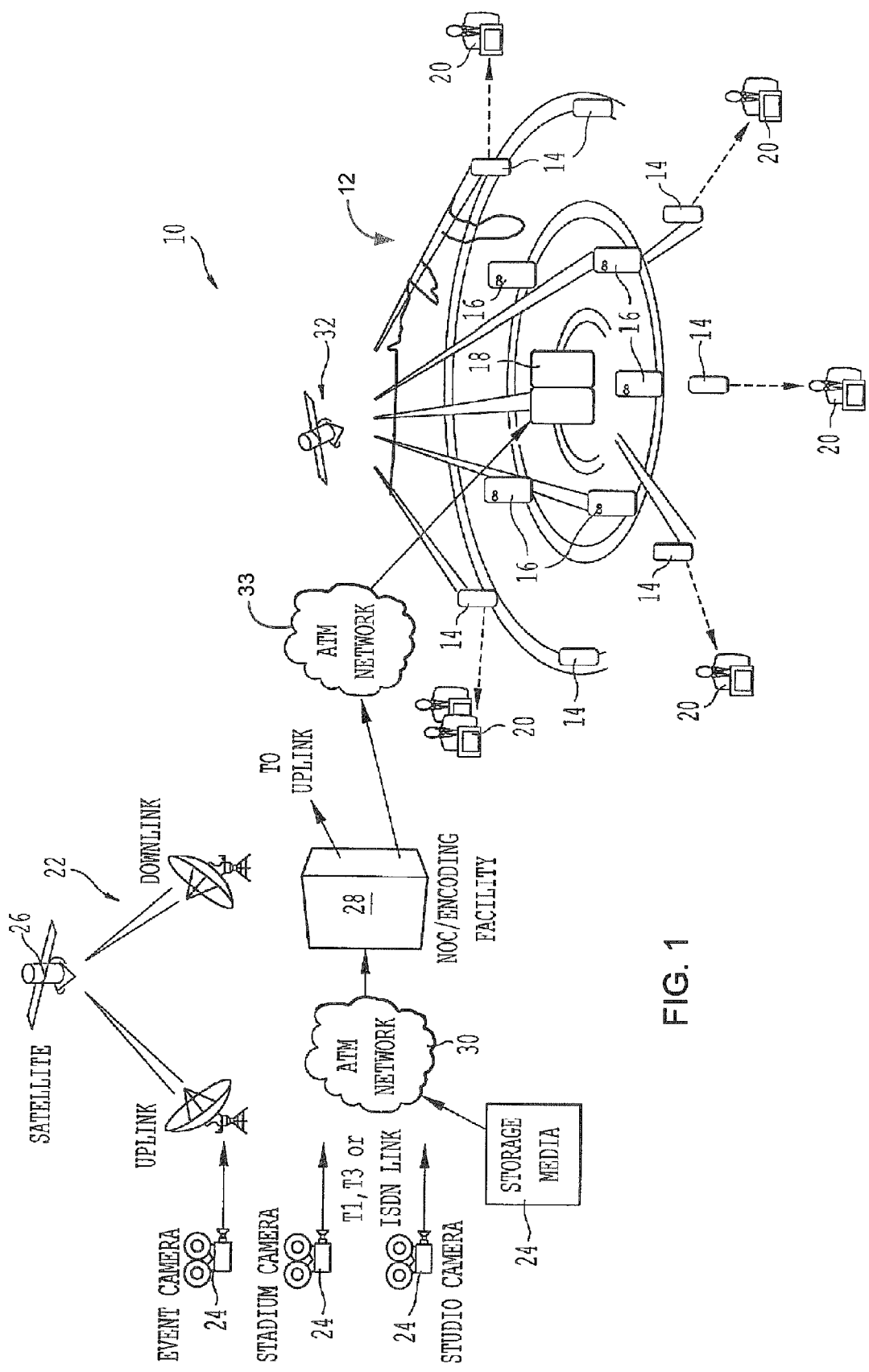
FIG. 1 is a block diagram depicting an Internet broadcast system for streaming media constructed in accordance with an example embodiment.

With reference to FIG. 1, a system 10 is provided which captures media (e.g., using a private network), and broadcasts the media (e.g., by satellite) to servers located at the edge of the Internet, that is, where users 20 connect to the Internet such as at a local Internet service provider or ISP. The system 10 bypasses the congestion and expense associated with the Internet backbone to deliver high-fidelity streams at low cost to servers located as close to end users 20 as possible.

To maximize performance, scalability and availability, the system 10 deploys the servers in a tiered hierarchy distribution network indicated generally at 12 that can be built from different numbers and combinations of network building components comprising media serving systems 14, regional data centers 16 and master data centers 18. The system also comprises an acquisition network 22 that is preferably a dedicated network for obtaining media or content for distribution from different sources. The acquisition network 22 can operate as a network operations center (NOC) which manages the content to be distributed, as well as the resources for distributing it. For example, content is preferably dynamically distributed across the system network 12 in response to changing traffic patterns in accordance with the present invention. While only one master data center 18 is illustrated, it is to be understood that the system can employ multiple master data centers, or none at all and simply use regional data centers 16 and media serving systems 14, or only media serving systems 14.

An illustrative acquisition network 22 comprises content sources 24 such as content received from audio and/or video equipment employed at a stadium for a live broadcast via satellite 26. The broadcast signal is provided to an encoding facility 28. Live or simulated live broadcasts can also be rendered via stadium or studio cameras, for example, and transmitted via a terrestrial network such as a T1, T3 or ISDN or other type of a dedicated network 30 that employs asynchronous transfer mode (ATM or other technology). In addition to live analog or digital signals, the content can include analog tape recordings, and digitally stored information (e.g., media-on-demand or MOD), among other types of content. Further, in addition to a dedicated link 30 or a satellite link 26, the content harvested by the acquisition network 22 can be received via the Internet, other wireless communication links besides a satellite link, or even via shipment of storage media containing the content, among other methods. The encoding facility 28 converts raw content such as digital video into Internet-ready data in different formats such as the Microsoft Windows Media (MWM), RealNetworks G2, or Apple QuickTime (QT) formats. The system 10 also employs unique encoding methods to maximize fidelity of the audio and video signals that are delivered via multicast by the distribution network 12.

With continued reference to FIG. 1, the encoding facility 28 provides encoded data to the hierarchical distribution network 12 via a broadcast backbone which is preferably a point-to-multipoint distribution network. While a satellite link indicated generally at 32 is used, the broadcast backbone employed by the system 10 of the present invention is preferably a hybrid fiber-satellite transmission system that also comprises a terrestrial network 33. The satellite link 32 is preferably dedicated and independent of a satellite link 26 employed for acquisition purposes. The tiered network building components 14, 16 and 18 are each equipped with satellite transceivers to allow the system 10 to simultaneously deliver live streams to all server tiers 14, 16 and 18 and rapidly update on-demand content stored at any tier. When a satellite link 32 is unavailable or impractical, however, the system 10 broadcasts live and on-demand content though fiber links provided in the hierarchical distribution network 12. Where the feed is pulled from in case of a failure is based on a set of routing rules that include priorities, weighting, and so on. In other words, the feed is pulled in a manner similar to the way routers currently operate, but at the actual stream level.

The system 10 employs a director agent to monitor the status of all of the tiers of the distribution network 12 and redirect users 20 to the optimal server, depending on the requested content. The director agent can originate, for example, from the NOC/encoding facility 28. The system employs an Internet Protocol or IP address map to determine where a user 20 is located and then identifies which of the tiered servers 14, 16 and 18 can deliver the highest quality stream, depending on network performance, content location, central processing unit load for each network component, application status, among other factors. Cookies and data from other databases can also be employed to facilitate this system intelligence.

Media serving systems 14 comprise hardware and software installed in ISP facilities at the edge of the Internet. The media serving systems preferably only serve users 20 in its subnetwork. Thus, the media serving systems 14 are configured to provide the best media transmission quality possible because the end users 20 are local. A media serving system 14 is similar to an ISP caching server, except that the content served from the media serving system is controlled by the content provider that input the content into the system 10. The media serving systems 14 each serve live streams delivered by the satellite link 32, and store popular content such as current and/or geographically-specific news clips. Each media serving system 14 manages its storage space and deletes content that is less frequently accessed by users 20 in its subnetwork. Content that is not stored at the media serving system 14 can be served from regional data centers.

Figure 2:
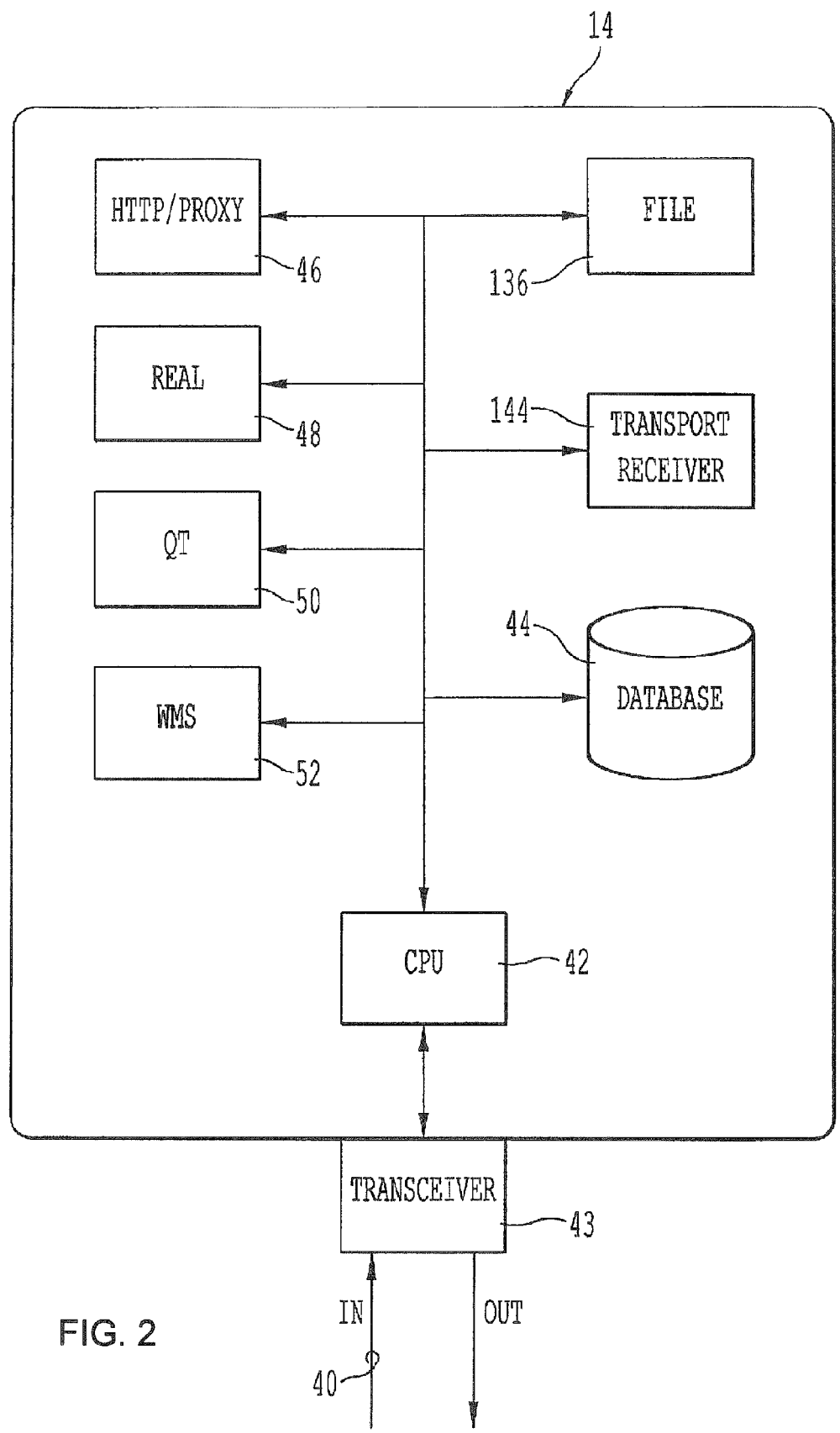
FIG. 2 is a block diagram depicting a media serving system constructed in accordance with an example embodiment.
Figure 7:
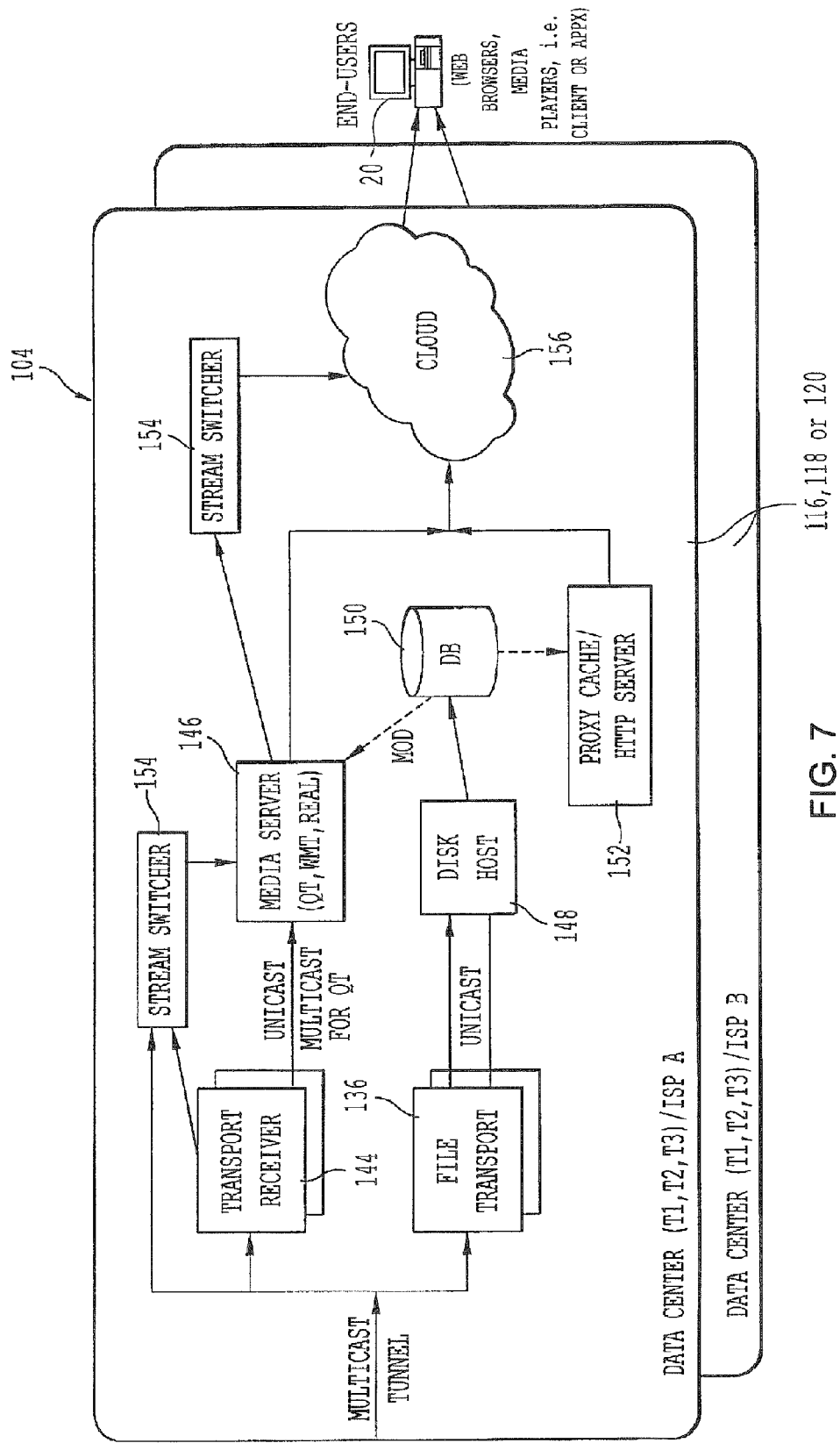

With reference to FIG. 2, a media serving system 14 comprises an input 40 from a satellite and/or terrestrial signal transceiver 43. The media serving system 14 can output content to users 20 in its subnetwork or control/feedback signals for transmission to the NOC or another hierarchical component in the system 10 via a wireline or wireless communication network. The media serving system 14 has a central processing unit 42 and a local storage device 44. A file transport module 136 and a transport receiver 144, which are described below with reference to FIG. 7, are provided to facilitate reception of content from the broadcast backbone. The media serving system 14 also preferably comprises one or more of an HTTP/Proxy server 46, a Real server 48, a QT server 50 and a WMS server 52 to provide content to users 20 in a selected format. The media serving system can also support Windows and Real caching servers, allowing direct connections to a local box regardless of whether the content is available. The content in the network 12 is then located and cached locally for playback. This allows for split live feeds by a local media serving system 14 regardless of whether is being sent via a broadcast or feed mechanism. Thus, pull splits from a media serving system 14 are supported, as well as broadcast streams that are essentially push splits with forward caching.

Figure 3:
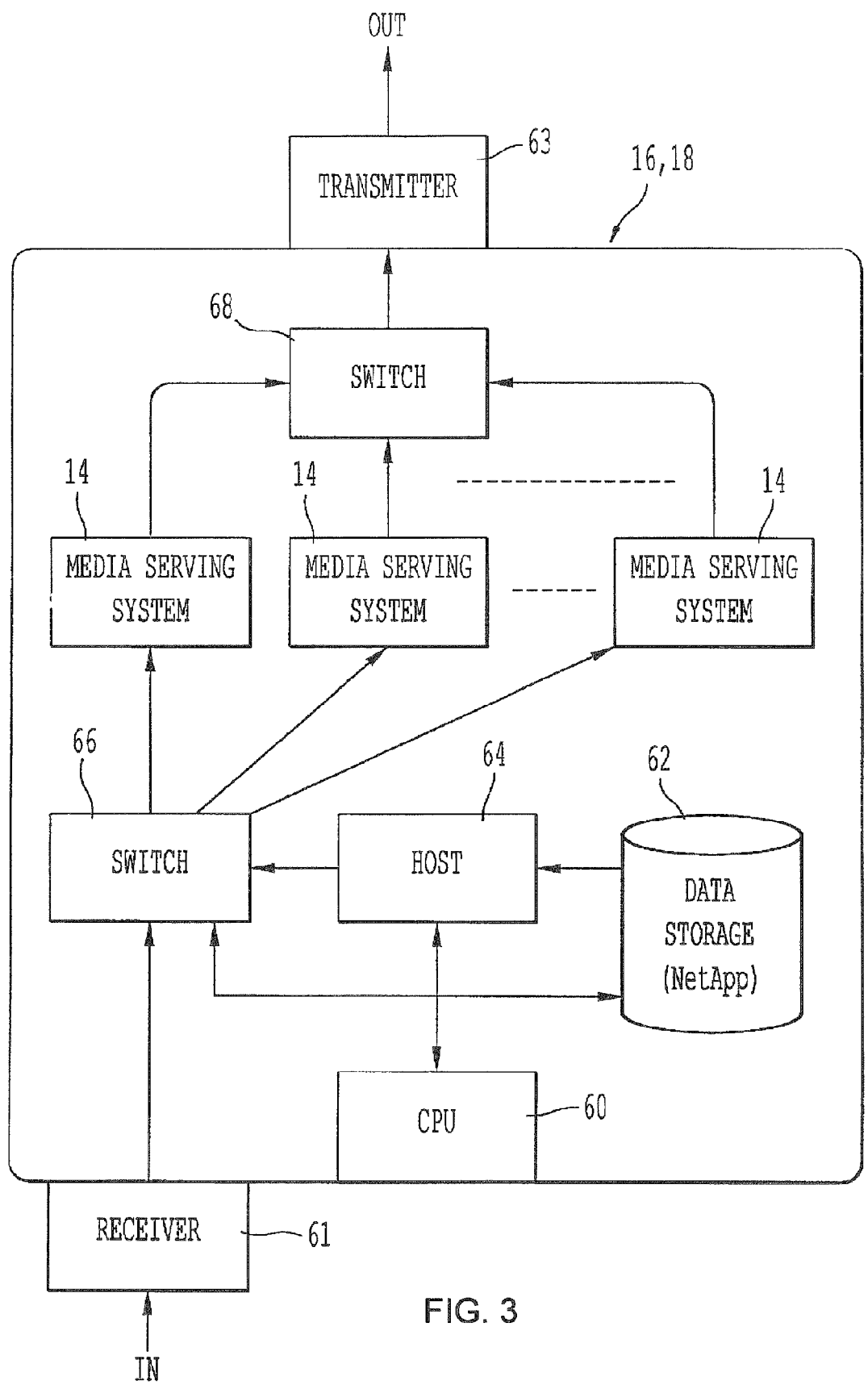
FIG. 3 is a block diagram depicting a data center constructed in accordance with an example embodiment.

The regional data centers 16 are located at strategic points around the Internet backbone. With reference to FIG. 3, a regional data center 16 comprises a satellite and/or terrestrial signal transceiver, indicated at 61 and 63, to receive inputs and to output content to users 20 or control/feedback signals for transmission to the NOC or another hierarchical component in the system 10 via wireline or wireless communication network. A regional data center 16 preferably has more hardware than a media serving system 14 such as gigabit routers and load-balancing switches 66 and 68, along with high-capacity servers (e.g., plural media serving systems 14) and a storage device 62. The CPU 60 and host 64 are operable to facilitate storage and delivery of less frequently accessed on-demand content using the servers 14 and switches 66 and 68. The regional data centers 16 also deliver content if a standalone media serving system 14 is not available to a particular user 20. The director agent software preferably continuously monitors the status of the standalone media serving systems 14 and reroutes users 20 to the nearest regional data center 16 if the nearest media serving system 14 fails, reaches its fulfillment capacity or drops packets. Users 20 are typically assigned to the regional data center 14 that corresponds with the Internet backbone provider that serves their ISP, thereby maximizing performance of the second tier of the distribution network 12. The regional data centers 14 also serve any users 20 whose ISP does not have an edge server.

The master data centers 18 are similar to regional data centers 16, except that they are preferably much larger hardware deployments and are preferably located in a few peered data centers and co-location facilities, which provide the master data centers with connections to thousands of ISPs. With reference to FIG. 3, master data centers 18 comprises multi-terabyte storage systems (e.g., a larger number of media serving systems 14) to manage large libraries of content created, for example, by major media companies. The director agent automatically routes traffic to the closest master data center 18 if a media serving system 14 or regional data center 16 is unavailable. The master data centers 18 can therefore absorb massive surges in demand without impacting the basic operation and reliability of the network.

Transmissions can occur out of the data centers 16 and 18. In the case of the satellite 32, however, transmissions can also be implemented by taking what is being received and routing a copy thereof directly to the uplink system without first passing through the media serving systems 14.

System Operation Overview

Figure 4:
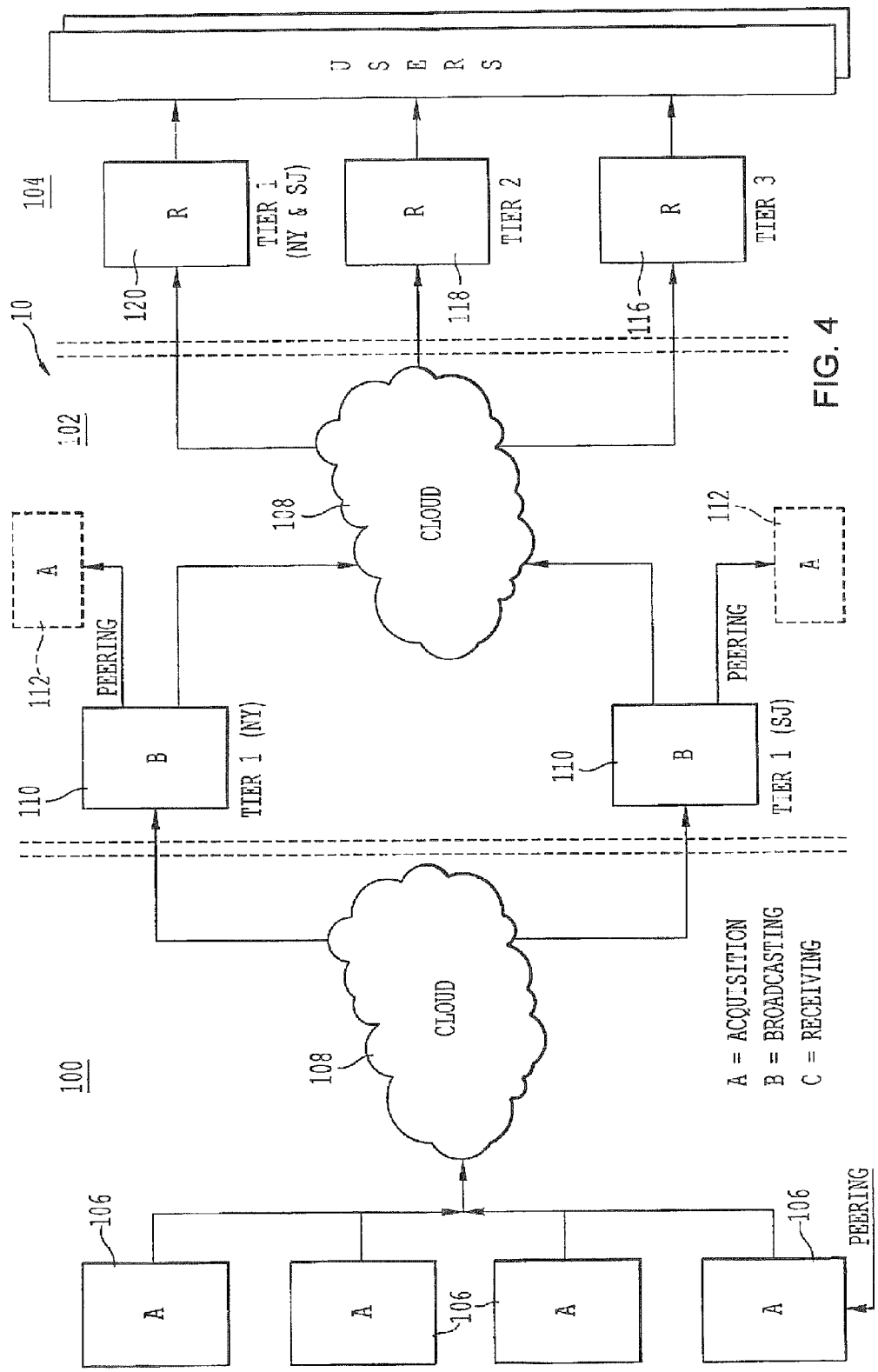
FIG. 4 illustrates a data flow in a Internet broadcast system for streaming media constructed in accordance with an example embodiment.

With reference to FIG. 4, the Internet broadcast system 10 for streaming media generally comprises three phases, that is, acquisition 100, broadcasting 102 and receiving 104. In the acquisition phase 100, content is provided to the system 10 from different sources such as Internet content providers (ICPs) or event or studio content sources. As stated previously, content can be received from audio and/or video equipment employed at a stadium for a live broadcast. The content can be, for example, live analog signals, live digital signals, analog tape recordings, digitally stored information (e.g., media-on-demand or MOD), among other types of content. The content can be locally encoded or transcoded at the source using, for example, file transport protocol (FTP), MSBD, or real-time transport protocol/real-time streaming protocol (RTP/RTSP). The content is collected using one or more acquisition modules 106, which are described in more detail below in connection with FIG. 5. The acquisition modules 106 represent different feeds to the system 10 in the acquisition network 12 and can be co-located or distributed. Generally, acquisition modules 106 can perform remote transcoding or encoding of content using FTP, MSBD, or RTP/RTSP or other protocols prior to transmission to a broadcaster 110 for multicast to edge devices and subsequent rendering to users 20 located relatively near to one of the edge devices. The content is then converted into a broadcast packet in accordance with an aspect of the present invention. This process of packaging packets in a manner to facilitate multicasting, and to provide insight at reception sites as to what the packets are and what media they represent, constitutes a significant advantage of the system 10 over other content delivery systems.

Content obtained via the acquisition phase 100 is preferably provided to one or more broadcasters 110 via a multicast cloud or network(s) 108. The content is unicast or preferably multicast from the different acquisition modules 106 to the broadcasters 110 via the cloud 108. As stated above, the cloud 108 is preferably a point-to-multipoint broadcast backbone. The cloud 108 can be implemented as one or more of a wireless network such as a satellite network or a terrestrial or wireline network such as optical fiber link. The cloud 108 can employ a dedicated ATM link or the Internet backbone, as well as a satellite link, to multicast streaming media. The broadcasters 110 are preferably in tier 120, that is, they are master data centers 18 that receive content from the acquisition modules 106 and, in turn, broadcast the content to other receivers in tiers 116, 118 and 120.

During the broadcasting phase 102, broadcasters 110 operate as gatekeepers, as described below in connection with FIG. 6, to transmit content to a number of receivers in the tiers 116, 118 and 120 via paths in the multicast cloud 108. The broadcasters 110 support peering with other acquisition modules indicated generally at 112. The peering relationship between a broadcaster 110 and an acquisition module 112 is via a direct link and each device agrees to forward the packets of the other device and to otherwise share content directly across this link, as opposed to a standard Internet backbone.

During the reception phase 104, high-fidelity streams that have been transmitted via the broadcasters 110 across the multicast cloud 108 are received by servers 14, 16 and 18 located as close to end users as possible. The system 10 is therefore advantageous in that streams bypass congestion and expense associated with the Internet backbone. As stated previously, the servers are preferably deployed in a tiered hierarchy comprising media serving systems 14, regional data centers 16 and master data centers 18 that correspond to tiers 116, 118 and 120, respectively. The tiers 116, 118 and 120 provide serving functions (e.g., transcoding from RTP to MMS, RealNet, HTTP, WAP or other protocol), as well as delivery via a local area network (LAN), the Internet, a wireless network or other network to user devices 122 for rendering (e.g., PCs, workstations, set-top boxes such as for cable, WebTV, DTV, and so on, telephony devices, and the like). The tiers in the reception phase are described in further detail below in connection with FIG. 7.

Data Transport Management

Figure 5:
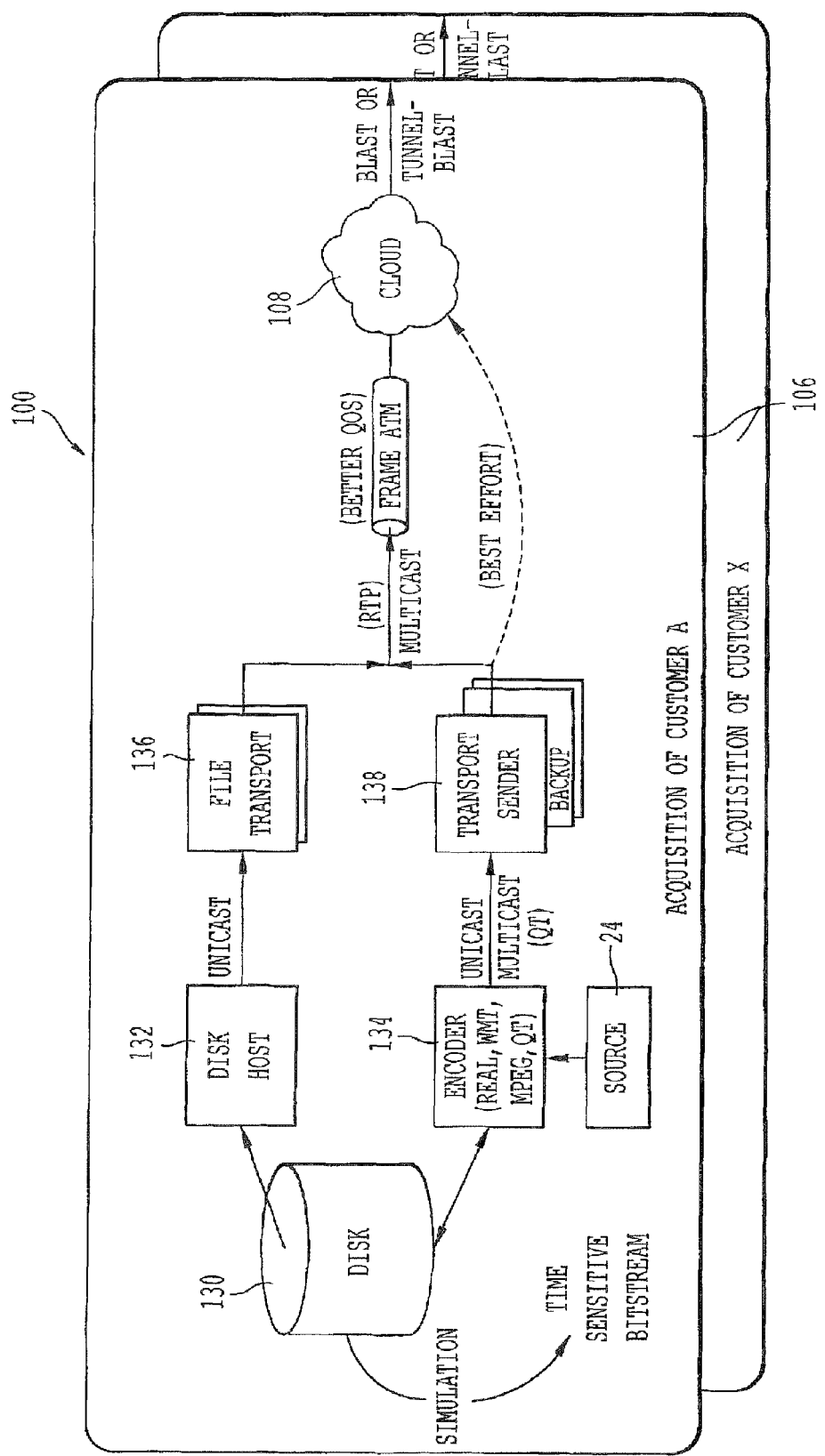
FIGS. 5, 6 and 7 are block diagrams depicting acquisition, broadcasting and reception phases employed in a Internet broadcast system for streaming media constructed in accordance with an example embodiment.
Figure 6:
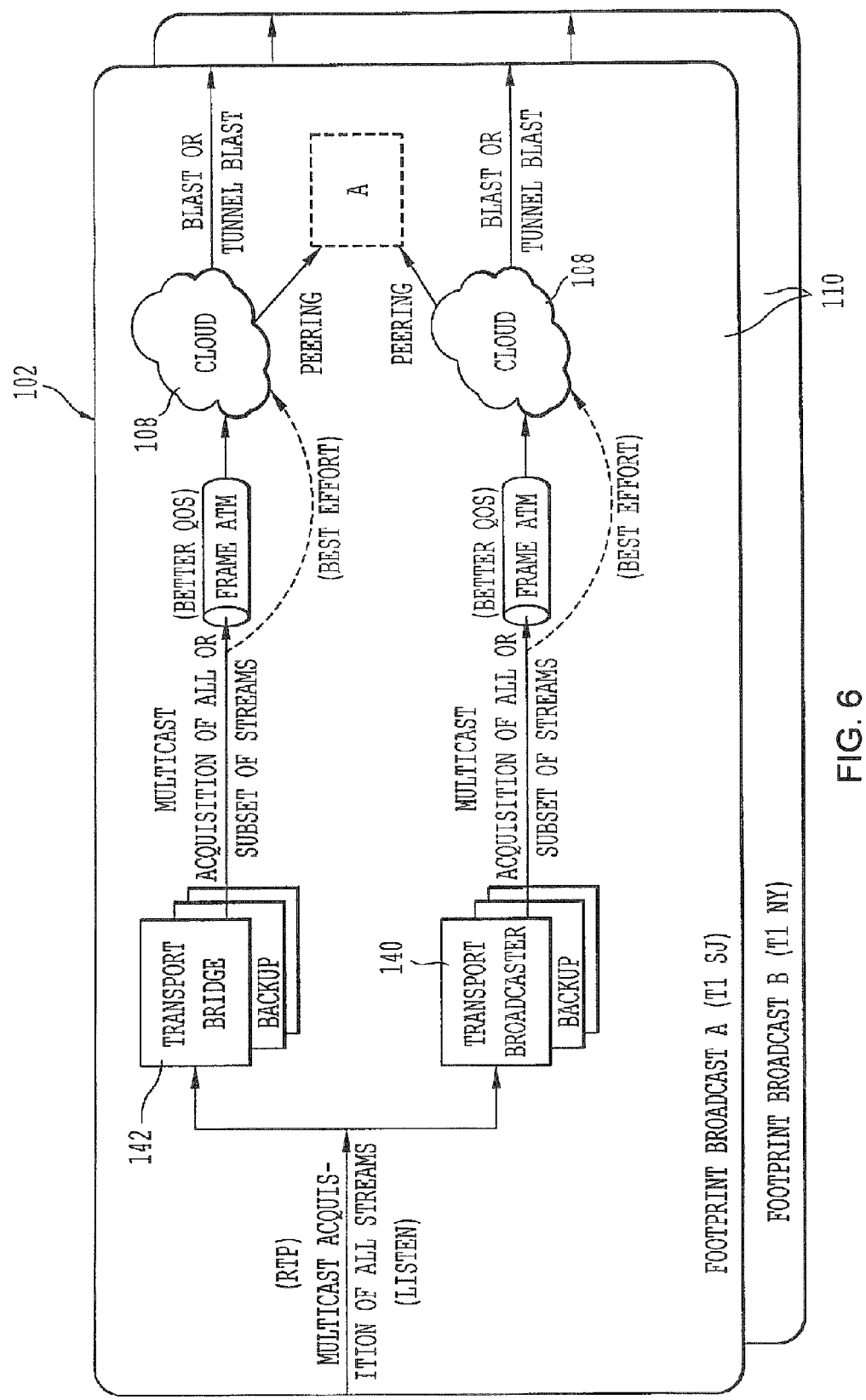

With reference to FIGS. 5, 6 and 7, hardware and/or software components associated with the acquisition 100, broadcasting 102 and reception phases 104 will now be described. These hardware and/or software components comprise various transport components for supporting MOD or live stream content distribution in one or more multicast-enabled networks in the system 10. The transport components can be, but are not limited to, a file transport module, a transport sender, a transport broadcaster, and a transport receiver. The content is preferably characterized as either live content and simulated/scheduled live content, or MOD (i.e., essentially any file). Streaming media such as live content or simulated/scheduled live content are managed and transported similarly, while MOD is handled differently.

Acquisition for plural customers A through X is illustrated in FIG. 5. By way of an example, acquisition for customer A involves an encoder, as indicated at 134, which can employ Real, WMT, MPEG, QT, among other encoding schemes with content from a source 24. The encoder also encodes packets into a format to facilitate broadcasting in accordance with the present invention. A disk 130 stores content from different sources and provides MOD streams, for example, to a disk host 132. The disk host 132 can be proxying the content or hosting it. Live content, teleconferencing, stock and weather data generating systems, and the like, on the other hand, is also encoded. The disk host 132 unicasts the MOD streams to a file transport module 136, whereas the encoder 134 provides the live streams to a transport sender 138 via unicast or multicast. The encoder can employ either unicast or multicast if QT is used. Conversion from unicast to multicast is not always needed, but multicast-to-multicast conversion can be useful. The file transport module 136 transfers MOD content to a multicast-enabled network. The transport sender 138 pulls stream data from a media encoder 134 or an optional aggregator and sends stream announcements (e.g., using session announcement protocol and session description protocol (SAP/SDP)) and stream data to multicast Internet protocol (IP) addresses and ports received from a transport manager. The transport manager is described below with reference to FIG. 8. When a Real G2 server is used to push a stream, as opposed to a pulling scheme, an aggregator can be used to convert from a push scheme to a pull scheme. The components described in connection with FIG. 5 can be deployed at the encoding center 28 or in a distributed manner at, for example, content provider facilities.

FIG. 6 illustrates an exemplary footprint for one of a plurality of broadcasts. As shown in FIG. 6, the broadcasting phase 102 is implemented using a transport broadcaster 140 and a transport bridge 142. These two modules are preferably implemented as one software program, but different functions, at a master data center 18 or network operations center. The transport broadcaster 140 performs transport path management, whereas the transport bridge 142 provides for peering. The broadcaster 140 and bridge 142 get data from the multicast cloud (e.g., network 108) being guided by the transport manager and forward it to an appropriate transport path. One transport broadcaster 140, for example, can be used to represent one transport path such as satellite uplink or fiber between data centers or even a cross-continental link to a data center in Asia from a data center in North America. The broadcaster 140 and bridge 142 listen to stream announcements from transport senders 138 and enable and disable multicast traffic to another transport path, accordingly. They can also tunnel multicast traffic by using TCP to send stream information and data to another multicast-enabled network. Thus, broadcasters 110 transmit corresponding subsets of the acquisition phase streams that are sent via the multicast cloud 108. In other words, the broadcasters 110 operate as gatekeepers for their respective transport paths, that is, they pass any streams that need to be sent via their corresponding path and prevent passage of other streams. Transmission can also be accomplished using TCP to another receiver regardless whether the system that the receiver is in is multicast-enabled. Thus, multicast operation can be disabled and the broadcast is still routed and distributed, although not quite as effectively or inexpensively as multicast.

FIG. 7 illustrates the reception phase 104 at one of a plurality of servers or data centers. As stated above, the data centers are preferably deployed in a tiered hierarchy 116, 118 and 120 comprising media serving systems 14, regional data centers 16 and master data centers 18, respectively. The tiers 116, 118 and 120 each comprise a transport receiver 144. Transport receivers can be grouped using, for example, the transport manager. Each transport receiver 144 receives those streams from the broadcasters 110 that are being sent to a group to which the receiver belongs. The transport receiver listens to stream announcements, receives stream data from plural transport senders 138 and feeds the stream data to media servers 146. The transport receiver 144 can also switch streams, as indicated at 154 (e.g., to replace a live stream with a local MOD feed for advertisement insertion purposes). The stream switch 154 can be a plug-in in the Media Server 14 or exist in the server itself to enable switching per end-user 20. The plug-in can interact with an advertisement platform to inject advertisements into streams. The MOD streams are received via the file transport 136 and stored, as indicated via the disk host 148, database 150 and proxy cache/HTTP server 152. The servers 146 and 152 provide content streams to users 20.

The transport components described in connection with FIGS. 5, 6 and 7 are advantageous in that they generalize data input schemes from encoders and optional aggregators to data senders, data packets within the system 10, and data feeding from data receivers to media servers, to support essentially any media format. The transport components preferably employ RTP as a packet format and XML-based remote procedure calls (XBM) to communicate between transport components.

Figure 8:
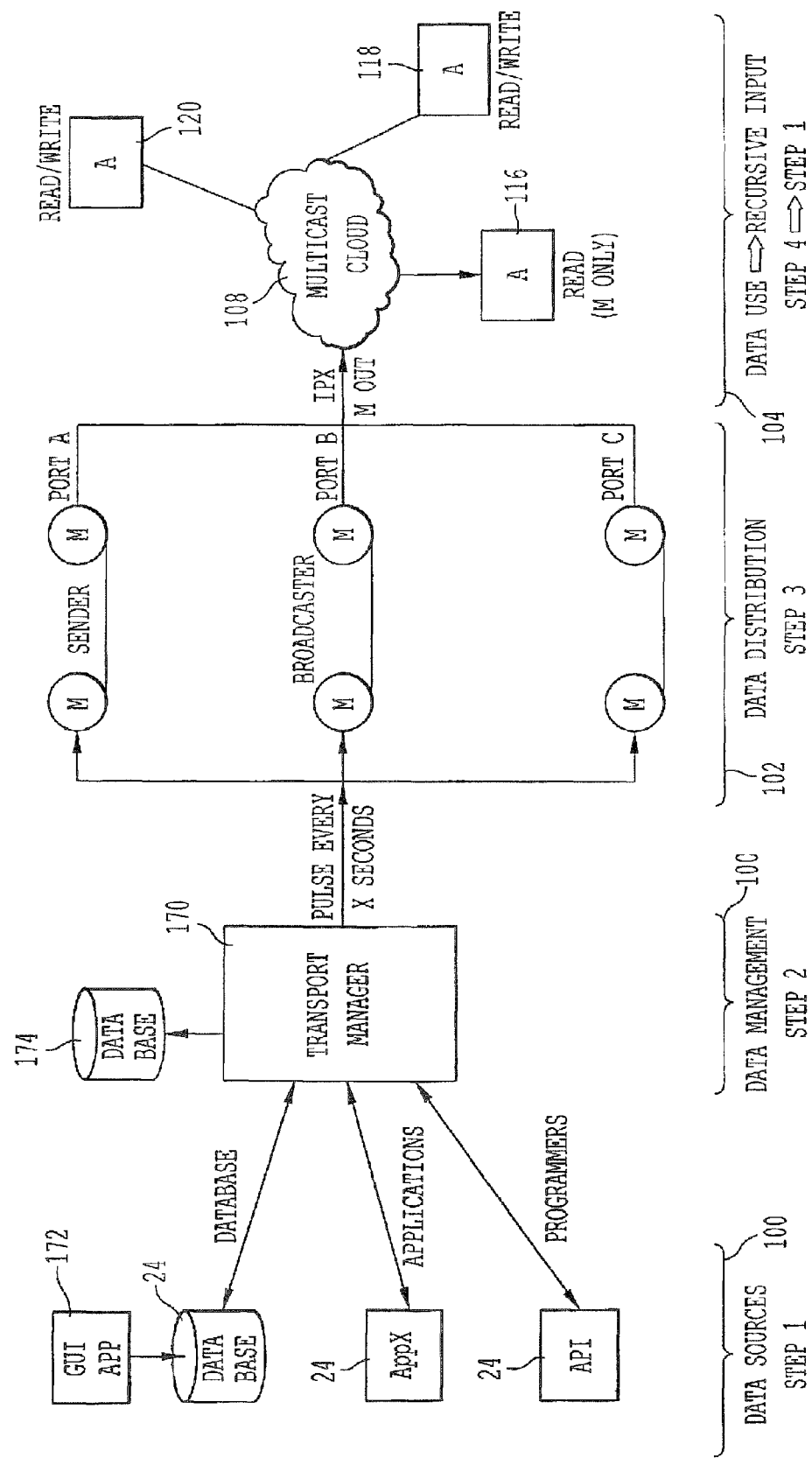
FIG. 8 is a block diagram depicting transport data management in a Internet broadcast system for streaming media constructed in accordance with an example embodiment.

The transport manager will now be described with reference to FIG. 8 which illustrates an overview of transport data management. The transport manager is preferably a software module deployed at the encoding facility 28 or other facility designated as a NOC. As shown in FIG. 8, multiple data sources 14 (e.g., database content, programs and applications) provide content as input into the transport manager 170. Information regarding the content from these data sources is also provided to the transport manager such as identification of input source 14 and output destination (e.g., groups of receivers). Decisions as to where content streams are to be sent and which groups of servers are to receive the streams can be predefined and indicated to the transport manager 170 as a configuration file or XBM function call in real-time. This information can also be entered via a graphical user interface (GUI) 172 or command line utility. In any event, the information is stored in a local database 174. The database 174 also stores information for respective streams relating to defined maximum and minimum IP address and port ranges, bandwidth usage, groups or communities intended to receive the streams, network and stream names, as well as information for user authentication to protect against unauthorized use of streams or other distributed data.

With continued reference to FIG. 8, a customer requests to stream content via the system 10 using, for example, the GUI 172. The request can include the customer's name and account information, the stream name to be published (i.e., distributed) and the IP address and port of the encoder or media server from which the stream can be pulled. Requests and responses are sent via the multicast network (e.g., cloud 108) using separate multicast addresses for each kind of transport component (e.g., a transport sender channel, a broadcaster channel, a transport manager channel and a transport receiver channel), or one multicast address and different ports. IP and port combinations can be used for TCP transmissions. An operator at the NOC 28 can approve the request if sufficient system resources are available such as bandwidth or media server capacity. Automatic approval can be provided by a scheduling system configured to provide immediate responses to attempted broadcasts. The transport manager 170 preferably pulls stream requests periodically. In response to an approved request, the transport manager 170 generates a transport command in response to the request (e.g., an XML-based remote procedure call (XBM) to the transport sender 138 corresponding to that customer which provides the assigned multicast IP address and port that the transport sender is allowed to use in the system 10.

The transport sender 138 receives the XBM call and responds by announcing the stream that is going to be sent. All of the transport components listen to the announcement. Once the transport sender 138 commences sending the stream into the assigned multicast IP address and port, the corresponding transport broadcaster 140 filter the stream. The transport receiver 144 joins the multicast IP address and receives the data or stream if the stream is intended for a group to which the receiver 144 belongs. As stated above in connection with FIG. 4, the receiver converts the steam received via the cloud 108 and sends it to the media server available to the users 20. The data is then provided to the media server associated with the receiver. Receivers 144 and broadcasters 140 track announcements that they have honored using link lists.

As stated above, the transport components described with reference to FIGS. 4-8 preferably use RPT as a data transport protocol. Accordingly, Windows Media, RealG2 and QT packets are wrapped into RTP packets. The acquisition network 22 preferably employs an RTP stack to facilitate processing any data packets, wrapping the data packets with RTP header and sending the data packets. RTSP connection information is generally all that is needed to commence streaming.

RTP is used for transmitting real-time data such as audio and video, and particularly for time-sensitive data such as streaming media, whether transmission is unicast or multicast. RTP employs User Datagram Protocol (UDP), as opposed to Transmission Control Protocol (TCP) that is typically used for non-real-time data such as file transfer and e-mail. Unlike with TCP, software and hardware devices that create and carry UDP packets do not fragment and reassemble them before they have reached their intended destination, which is important in streaming applications. RTP adds header information that is separate from the payload (e.g., content to be distributed) that can be used by the receiver. The header information is merely interpreted as payload by routers that are not configured to use it.

RTSP is an application-level protocol for control over the delivery of data with real-time properties and provides an extensible framework to enable controlled, on-demand delivery of real-time data including live feeds and stored clips. RTSP can control multiple data delivery sessions, provide means for choosing delivery channels such as UDP, multicast UDP and TCP, and provide means for choosing delivery mechanisms based on RTP. HTTP is not suitable for streaming media because it is more of a store-and-forward protocol that is more suitable for web pages and other content that is read repeatedly. Unlike HTTP, RTSP is highly dynamic and provides persistent interactivity between the user device (hereinafter referred to as a client) and server that is beneficial for time-based media. Further, HTTP does not allow for multiple sessions between a client and server, and travels over only a single port. RTP can encapsulate HTTP data, and can be used to dynamically open multiple RTP sessions to deliver many different streams at the same time.

The system 10 employs transmission control software deployed at the encoding facilities 28, which can operate as a network operations center (NOC), and at broadcasters 110 (e.g., master data centers 120) to determine which streams will be available to which nodes in the distribution system 12 and to enable the distribution system 12 to support one-to-one streaming or one-to-many streaming. The extensible language capabilities of RTSP augment the transmission control software at the edge of the distribution network 12. Since RTSP is a bi-directional protocol, its use enables encoders 134 and receivers 144 to talk to each other, allowing for routing, conditional access (e.g., authentication) and bandwidth control in the distribution network 12. Standard RTSP proxies can be provided between any network components to allow them to communicate with each other. The proxy can therefore manage the RTSP traffic without necessarily understanding the actual content.

For every RTSP stream, there is an RTP stream. Further, RTP sessions support data packing with timestamps and sequence numbers. They can also be used for carrying stereo information, wide screen versions of requested media, different audio tracks, and so on. RTP packets are wrapped in a broadcast protocol. Applications in the receiving phase 104 can use this information to determine when to expect the next packet. Further, system operators can use this information to monitor network 12 and satellite 32 connections to determine the extent of latency, if any.

Encoders and data encapsulators written with RTP as the payload standard are advantageous because off-the-shelf encoders (e.g., MPEG2 encoders) can be introduced without changing the system 10. Further, encoders that output RTP/RTSP can connect to RTP/RTSP transmission servers. In addition, the use of specific encoder and receiver combinations can be eliminated when all of the media players support RTP/RTSP.

The authentication and selective network connection provided by the present invention allows networks to offer multi-tiered service (e.g., different users can access different types of streams), and control over user errors when requesting access (e.g., requesting incorrect bandwidth for their connection speed). Thus, service providers can distinguish users who have paid for value-added services and authenticate these users for higher quality digital audio and video services.

System Operation: Broadcast Triggers

Methods and systems described with respect to FIGS. 9-15 provide a means for performing real-time processing and modification of content streams (e.g., audio streams, video streams, software downloads, etc.) for delivery across one or more networks to end users. As will be discussed in greater detail below, such methods and systems enable a flexible and adaptable approach for delivering video content from a content publisher to a heterogeneous set of end users across the Internet. Advantages of such methods and systems include, for example, on-the-fly targeted advertising to specific end users (or a group of end users), adherence to localized broadcasting rules and regulations, as well as other advantages that will become more apparent in the discussion below.

Figure 9:
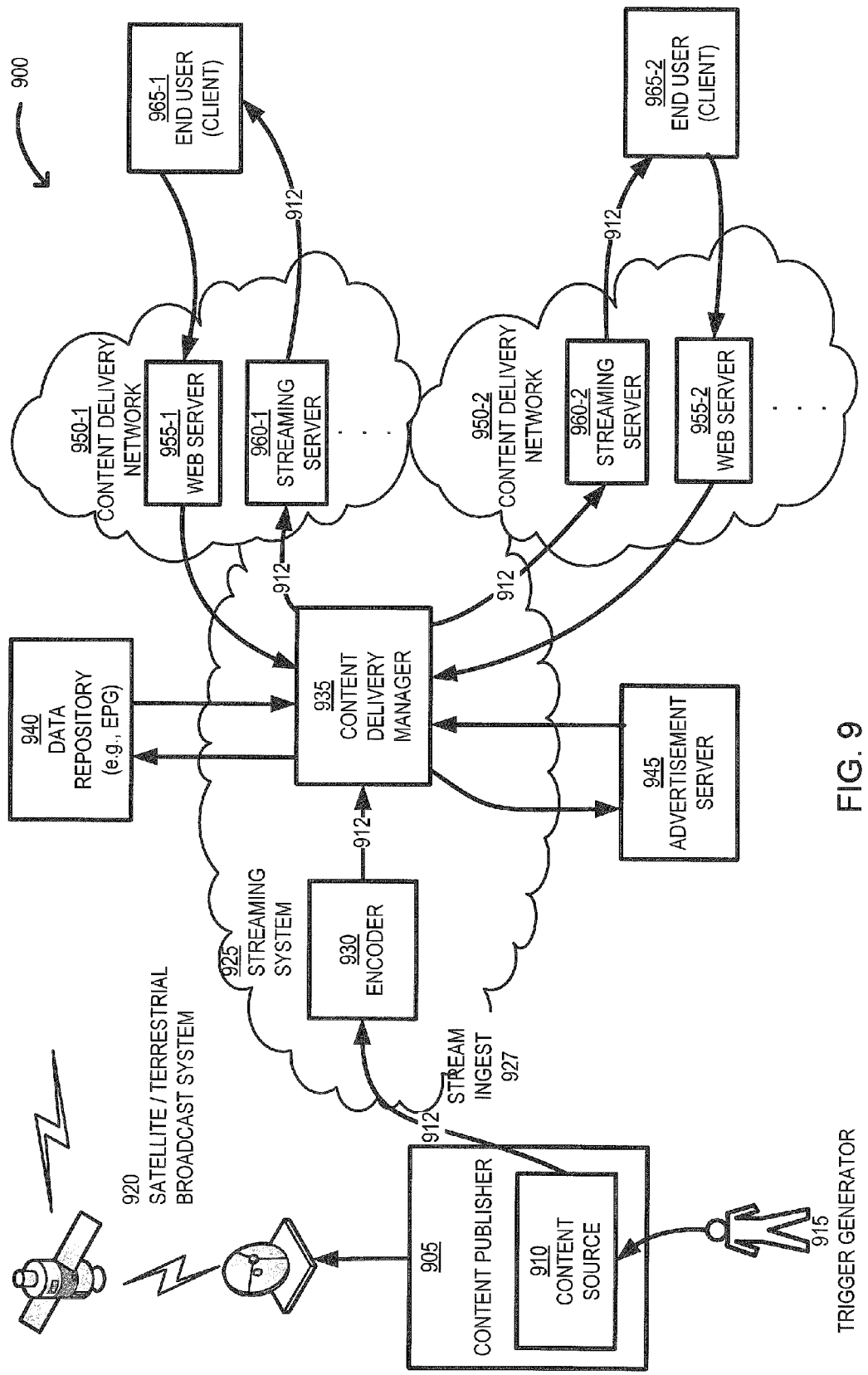
FIG. 9 is a block diagram of a network environment for providing content delivery management and administration in accordance with an example embodiment.

More specifically, FIG. 9 is a block diagram of a network environment 900 including a content publisher 905 and associated content source 910, a trigger entry 915, satellite/terrestrial broadcast system 920, a streaming system 925 including an encoder 930 and content delivery manager 935, a data repository 940 and an advertisement server 945, content delivery network 950-1 including web server 955-1 and streaming server 960-1 in communication with end user (i.e., client) 965-1, and content delivery network 950-2 including web server 955-2 and streaming server 960-2 in communication with end user (i.e., client) 965-2.

With reference to FIG. 9, It should be noted that content publisher 905 and content source 910 are shown as related logical entities and do not necessarily have to be located in the same physical location. For example, the content source 910 may acquire an input (e.g., video content via a camera at a sporting event) in a first location and, then, transmit the input to the content publisher 905 for processing at a second location. Of course, the content publisher 905 and content source 910 may also be one and the same (i.e., the same entity) sharing the same functional and logical characteristics while residing at the same physical location. The configuration shown in FIG. 9 is shown for purposes of illustration only, and depicts only one example representation of the methods and systems for content distribution and delivery as described herein.

In general, the content source 910 (and/or content publisher 905) acquires content (e.g., video capture of a live sporting event) for subsequent and, at times, real-time distribution to various end users associated with the content publisher 905. Note that content streams may be stored and cached for on-demand type contribution as well. As shown in FIG. 9, the acquired content can be distributed via traditional terrestrial antennae and satellite broadcasting means. For example, satellite/terrestrial broadcast system 920 disseminates video content acquired by the content source 910 to end users that are capable of receiving such traditional satellite and terrestrial antennae communications.

In addition to the satellite/terrestrial broadcast system 920, the content source 910 (and/or content publisher 905) can also distribute a content stream 912 (e.g., audio media, video media, etc.) via streaming system 925 in furtherance of various embodiments that will be described in greater detail below. Accordingly, streaming system 925 has similar architectures and provides similar functionalities as the methods and systems previously described with respect to the example embodiments in FIGS. 4-8.

A trigger generator 915 can inject additional information (i.e., a trigger signal) into the content stream 912 that is not initially captured by the content source 910. The trigger generator 915 can be an automated process (e.g., software, sensors, etc.), a human (as shown in FIG. 9), as well as other means suitable for entering additional information into a content stream. Typically, the trigger signal contains information related to a broadcaster's audio/video play-out system during a traditional television-like broadcast.

For example, assume that a content publisher "Broadcaster A" intends to provide a live broadcast of a sporting event. Broadcaster A would acquire the audio/video directly from the sporting event via a content source such as a camera system installed at the event. As it is commonly known, a live (or real-time) broadcast of a sporting event does not provide a continuous content stream from a single static acquisition source such as the camera system. In other words, a live broadcast typically includes commercials, cut-outs to other broadcast feeds, and the like. These other content feeds are managed by Broadcaster A's play-out system.

In the context of embodiments described in this specification, the play-out system would indicate a switch or transfer to the alternate content feeds (e.g., commercials/advertisements, cut-outs, etc.) by way of a trigger signal injected into the content stream (i.e., as injected by the trigger generator 915). In this manner, the trigger signal provides real-time notification to downstream broadcast systems (e.g., content delivery manager 935) that the content stream is subject to switch to an alternate content feed (e.g., commercial or advertisement). The downstream broadcast systems have discretion to switch to an alternative content feed or continue transmitting the original content stream in accordance with the downstream broadcast systems' contractual relationship with the broadcaster (i.e., content publisher).

Still referring to FIG. 9, the content source 910 (and/or content publisher 905) transmits the content stream 912 to the encoder 930 at stream ingest 927. Note that the trigger signal may be injected into the content stream 912 at the content source 910, at the content publisher 905, or at another third party entity responsible for providing trigger signals and play-out management of the content stream 912.

According to one example embodiment, the encoder 930 provides real-time encoding of the content stream 912 and can include Real encoding, QT encoding, WM encoding, and the like (see FIG. 2). After being encoded at the encoder 930, the content stream 912 is transmitted within the streaming system 925 to content delivery manager 935. In one example configuration, the content stream 912 is propagated downstream through the streaming system 925 (and possibly the content delivery network 950) using RTSP (Real Time Streaming Protocol). In such a configuration, the actual audio/video data contained in the content stream may be distributed downstream using RTP (Real-time Transport Protocol).

During general operation, and as will be discussed in greater detail below with respect to FIG. 10, the content delivery manager 935 provides multiple functions related to content stream processing and subsequent content delivery to end users (e.g., real-time streaming, on-demand delivery, etc.). As is shown in FIG. 9, the content delivery manager 935 is in communication with data repository 940 (e.g., Electronic Programming Guide) and advertisement server 945. Depending on how the trigger signals in the content stream 912 are processed, the content delivery manager 935 may interact with (i.e., transcieve data with) both the data repository 940 and the advertisement server 945 prior to delivering the content stream 912 to end users. Such processing is discussed in more detail below with respect to FIG. 10.

After processing the content stream 912, the content delivery manager 935 transmits the content stream 912 (or a modification thereof) to content delivery network 950-1 and content delivery network 950-2 (hereinafter collectively referred to as content delivery network 950) for subsequent delivery to end user 965-1 and end user 965-2 (hereinafter collectively referred to as end user 965), respectively.

In the example embodiment of FIG. 9, content delivery network 950-1 comprises a web server 955-1 and streaming server 960-1. Likewise, content delivery network 950-2 comprises a web server 955-2 and streaming server 960-2. For brevity, web servers 955-1 and 955-2 will be collectively referred to as web server 955, while streaming servers 960-1 and 960-2 will be collectively referred to as streaming server 960. Generally, web server 955 provides front-end interaction with end user 965 by serving web pages, initiating registration/logon services, providing e-commerce and transactional payment capabilities, and the like. As its name suggests, streaming server 960 typically provides back-end streaming services by delivering, for example, the content stream 912 as provided by content delivery manager 935. Note that the vertical ellipses in each content delivery network 950-1 and 950-2 indicate that there can be multiple web and/or streaming servers associated with each respective content delivery network.

Although shown as different entities in the example configuration of FIG. 9, it should be noted that the functionality of web server 955 and streaming server 960 may be implemented in a single device or, alternatively, in multiple distributed devices within content delivery network 950 that have combined functionality of web server 955 and streaming server 960, according to embodiments herein.

Other example embodiments can include betting triggers used for delivery of online gambling and betting events such as horse races, dog races, etc. For instance, in one embodiment the trigger generator 915 can inject a trigger signal into a content stream, where the content stream is that of, say, a dog race and the pre-race activities associated therewith. Assume that the trigger signal is injected into the content stream to indicate the start of the dog race. In one embodiment, the content delivery manager 935 could detect the trigger signal and cease any further betting activities associated with that particular race. For example, the content delivery manager 935 could instruct web server 955 to stop accepting further bets for the dog race that had just begun (i.e., cease e-commerce interaction with the end user). The trigger signal could further indicate that the race has completed and that the content delivery manager 935 should discontinue delivery of the content stream to end users authorized to view only that race.

Referring now to FIG. 8, a block diagram depicts functionality of a content delivery manager in the context of a network environment 1000. As shown, network environment 1000 includes a content source 1005 and associated content publisher 1010, content delivery manager 1040, content delivery network 1045 in communication with end user (i.e., client) 1050, advertisement server 1060, and Electronic Programming Guide (EPG) 1055. The content delivery manager 1015 further includes stream intake module 1020, trigger processing logic 1025, stream packaging module 1030, and stream delivery module 1040.

In the example embodiment of FIG. 10, assume that content source 1005 acquires and subsequently distributes a content stream associated with a particular event or program (e.g., a football match) as provided by content publisher 1010. For instance, in the example embodiment of FIG. 10, the content stream contains content associated with a particular channel (i.e., Channel 2 "CH. 2") of multiple channels associated with content publisher 1010. Furthermore, Channel 2 in this example is associated with a program (i.e., Program 6 "P6") during a time period Time 2 "T2". The various related channels, programs, and time periods of content publisher 1010 are depicted in Electronic Programming Guide "EPG" 1055.

It should also be noted that, in accordance with the example broadcast scenario described above with respect to FIG. 10, the EPG 1055 and end user 1050 are both associated with a particular geographic region "Region A" (e.g., Ireland, Chicago, a specific zip code, etc.). The EPG 1055 may also include programming information (e.g., channels, programs, etc.) for other geographic regions as well.

The content source 1005 may interact with the content publisher 1010 for various reasons, such as for play-out management and control. For example, the content publisher 1010 may inject a trigger signal(s) into the content stream for subsequent processing at the content delivery manager 1015.

Note that content publisher 1010 and content source 1005 have the same or similar configurations, relationships, and functionalities as the content publisher 905 and content source 910 previously described with respect to FIG. 9.

During general operation, the content delivery manager 1015 receives the content stream via stream intake module 1020. The stream intake module 1020 processes the content stream and then, according to one example embodiment, sends the content stream to stream delivery module 1040. During its processing, the stream intake module 1020 is also capable of detecting and/or extracting trigger signals embedded in the content stream. For example, in one embodiment the trigger signal contains additional information (e.g., metadata) related to the type of content and/or trigger event (e.g., advertisement, black out, etc.) associated with the trigger signal.

Having detected and/or extracted a trigger signal within the content stream, the stream intake module 1020 provides information related to the detected trigger signal to trigger processing logic 1025. For example, as shown in the embodiment of FIG. 10, the stream intake module 1020 indicates to the trigger processing logic 1025 that a detected trigger signal is associated with Channel 2 at time period T2.

In one example embodiment, and with the trigger signal information provided by the stream intake module 1020, the trigger processing logic 1025 interacts with EPG 1055 (e.g., across a network such as the Internet) to determine whether the content stream should be modified. As shown in the example embodiment of FIG. 10, for Channel 2 at time period T2, program P6 should be "blacked out" for Region A. When a given program is to be "blacked out" for a given region and time period, that program is not authorized to be broadcasted to users in the given region for the given time period (e.g., for contractual reasons associated with the content publisher 1010). For example, a national broadcaster or content publisher may have a particular sporting event blacked out for a given time and/or region if the same sporting event is to be broadcasted by a local broadcaster or station. Thus, returning to the example scenario of FIG. 10, the EPG 1055 indicates to the content delivery manager 1015 via trigger processing logic 1025 that program P6 should be blacked out for time period T2 in Region A. The EPG 1055 can further indicate to the content delivery manager 1015 that program P6 on Channel 2 should also be blacked out during time period T3 in Region A.

Note that trigger processing logic 1025 can use proximity data (e.g., an IP address) associated with the end user 1050 to determine which region to query within EPG 1055 (as depicted by arrow 1037).

Assume that in another example embodiment the EPG 1055 indicates that program P6 does not need to be blacked out during time period T2 in Region A. In this example, the trigger processing logic 1025 can determine that the trigger signal detected in the content stream indicates a modification to the content stream, such as a commercial break. As such, the trigger processing logic 1025 would initiate a process to modify the content stream by inserting an advertisement or commercial into the content stream for delivery to end users. As will be described in more detail below, insertion of a commercial or advertisement may be targeted to end users in a particular geographic region (e.g., Region A).

Having determined that the content stream should be blacked out and/or a commercial or advertisement should be inserted, the trigger processing logic 1025 passes this information along to stream packaging module 1030. Stream packaging module 1030 prepares and configures modifications to content streams in accordance with instructions from the trigger processing logic 1025.

For example, if the trigger processing logic 1025 instructs the stream packaging module 1030 that the corresponding content stream currently being processed by the content delivery manager 1015 should be blacked out, the stream packaging module 1030 can instruct the stream delivery module 1040 to terminate delivery of the content stream to end users that are subject to the black out restrictions. Alternatively, the stream packaging module 1030 can provide alternative content (e.g., commercials, advertisements, pre-configured black out programs or static messages, etc.) to stream to end users in lieu of the blacked out content stream.

If the trigger processing logic 1025 indicates to the stream packaging module 1030 that the content stream should be modified by inserting a commercial or advertisement, the stream packaging module 1030 would perform various steps to determine which commercials or advertisement should be inserted into the content stream. For example, in one embodiment the stream packaging module 1030 inserts pre-configured commercials and/or advertisements into the content stream that have been provided by the content publisher or other entities potentially associated with monetizing content delivery to end users.

In another example embodiment, the stream packaging module 1030 queries an advertisement server 1060 (e.g., across a network such as the Internet) to determine which commercials or advertisements should be inserted into the content stream. In this manner, the stream packaging module 1030 can provide information that is specific to the user (i.e., user data 1035) to the advertisement server 1060. Information specific to a user can include, for example, geographical data, prior viewing history such as which types/categories of content a user has previously requested for viewing, information personal to the user such as age, sex, and the like, as well as other attributes suitable for selecting commercials and/or advertisements for a targeted advertising campaign. Assume for the example embodiment of FIG. 10 that the user data 1035 contains proximity parameters (e.g., IP address) that indicate a geographic region in which the end user 1050 is located (i.e., Region A). With the user data 1035, the advertisement server 1060 provides the content delivery manager 1015 with a commercial and/or advertisement targeted to end user's 1055 geographic region (i.e., Region A). As such, the targeted commercial and/or advertisement would be inserted into the content stream at stream delivery module 1040 for delivery to end user 1055 via content delivery network 1045.

Figure 11:
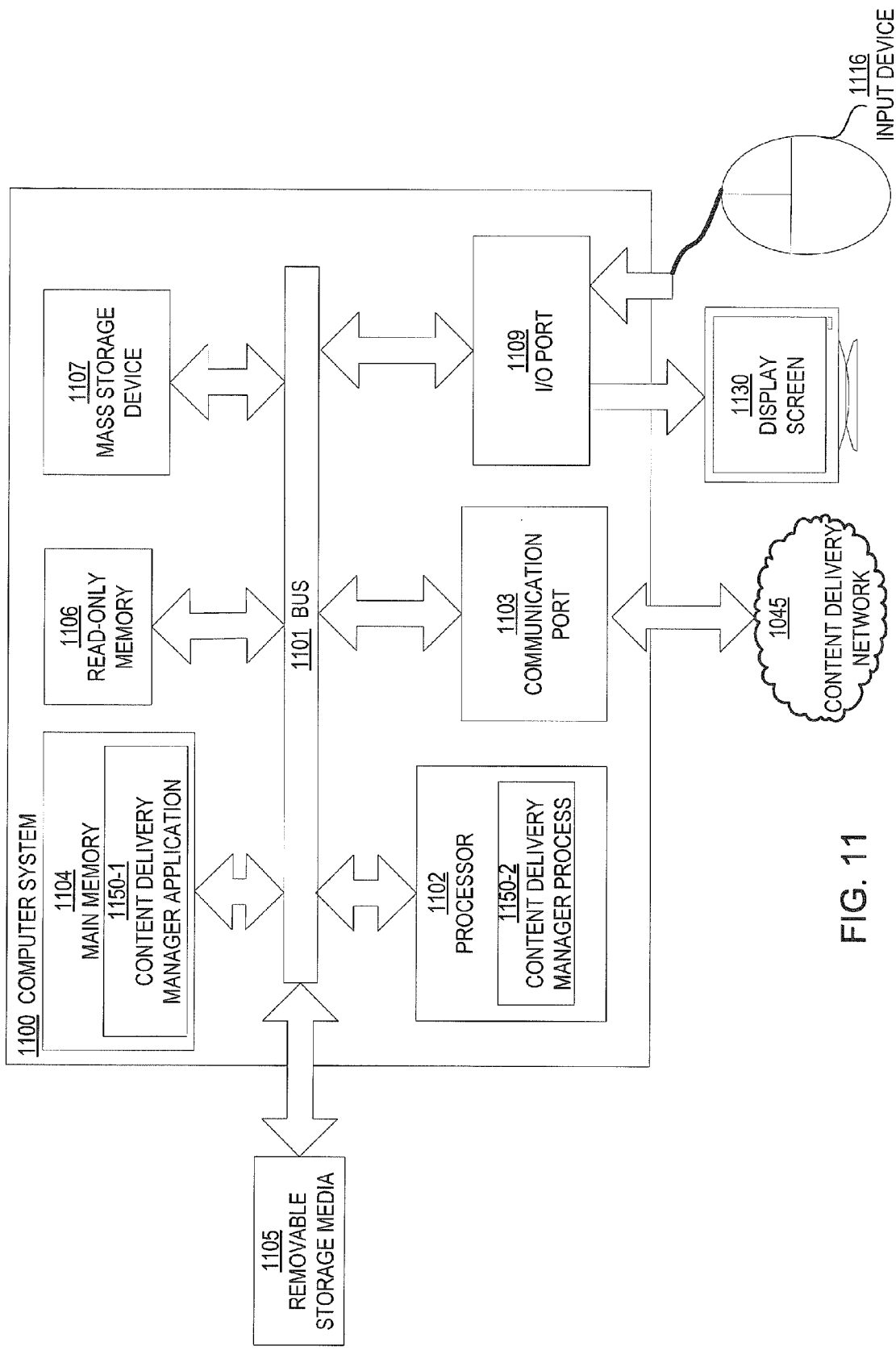
FIG. 11 is a flow chart that shows processing operations performed by a content delivery manager in accordance with an example embodiment.

FIG. 11 is a schematic diagram of a computer system 1100 upon which embodiments of the present invention may be carried out and implemented. For example, one or more computing devices 1100 may be used to manage and/or administer the streaming of content across one or more networks (e.g., the Internet, content delivery networks (CDNs), and the like).

According to the present example, the computer system 1100 includes a bus 1101 (i.e., interconnect), at least one processor 1102, at least one communications port 1103, a main memory 1104, a removable storage media 1105, a read-only memory 1106, and a mass storage 1107. Processor(s) 1102 can be any known processor, such as, but not limited to, an Intel® Itanium® or Itanium 2® processor(s), AMD® Opteron® or Athlon MP® processor(s), or Motorola® lines of processors. Communications ports 1103 can be any of an RS-232 port for use with a modem based dial-up connection, a 10/100 Ethernet port, a Gigabit port using copper or fiber, or a USB port. Communications port(s) 1103 may be chosen depending on a network such as a Local Area Network (LAN), a Wide Area Network (WAN), or any network to which the computer system 1100 connects (e.g., content delivery network 950 and/or 1045). The computer system 1100 may be in communication with peripheral devices (e.g., display screen 130, input device 116) via Input/Output (I/O) port 1109.

Main memory 1104 can be Random Access Memory (RAM), or any other dynamic storage device(s) commonly known in the art. Read-only memory 1106 can be any static storage device(s) such as Programmable Read-Only Memory (PROM) chips for storing static information such as instructions for processor 1102. Mass storage 1107 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 101 communicatively couples processor(s) 1102 with the other memory, storage and communications blocks. Bus 1101 can be a PCI/PCI-X, SCSI, or Universal Serial Bus (USB) based system bus (or other) depending on the storage devices used. Removable storage media 1105 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 1104 is encoded with content delivery manager application 1150-1 that supports functionality as discussed above and as discussed further below. Content delivery manager application 1150-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 1102 accesses main memory 1104 via the use of bus 1101 in order to launch, run, execute, interpret or otherwise perform the logic instructions of the content delivery manager application 1150-1. Execution of content delivery manager application 1150-1 produces processing functionality in content delivery manager process 1150-2. In other words, the content delivery manager process 1150-2 represents one or more portions of the content delivery manager application 1150-1 performing within or upon the processor(s) 102 in the computer system 1100.

It should be noted that, in addition to the content delivery manager process 1150-2 that carries out method operations as discussed herein, other embodiments herein include the content delivery manager application 1150-1 itself (i.e., the unexecuted or non-performing logic instructions and/or data). The content delivery manager application 1150-1 may be stored on a computer readable medium (e.g., a repository) such as a floppy disk, hard disk or in an optical medium. According to other embodiments, the content delivery manager application 1150-1 can also be stored in a memory type system such as in firmware, read only memory (ROM), or, as in this example, as executable code within the main memory 1104 (e.g., within Random Access Memory or RAM). For example, content delivery manager application 1150-1 may also be stored in removable storage media 1105, read-only memory 1106, and/or mass storage device 1107.

In addition to these embodiments, it should also be noted that other embodiments herein include the execution of the content delivery manager application 1150-1 in processor(s) 1102 as the content delivery manager process 1150-2. Thus, those skilled in the art will understand that the computer system 1100 can include other processes and/or software and hardware components, such as an operating system that controls allocation and use of hardware resources.

Figure 10:
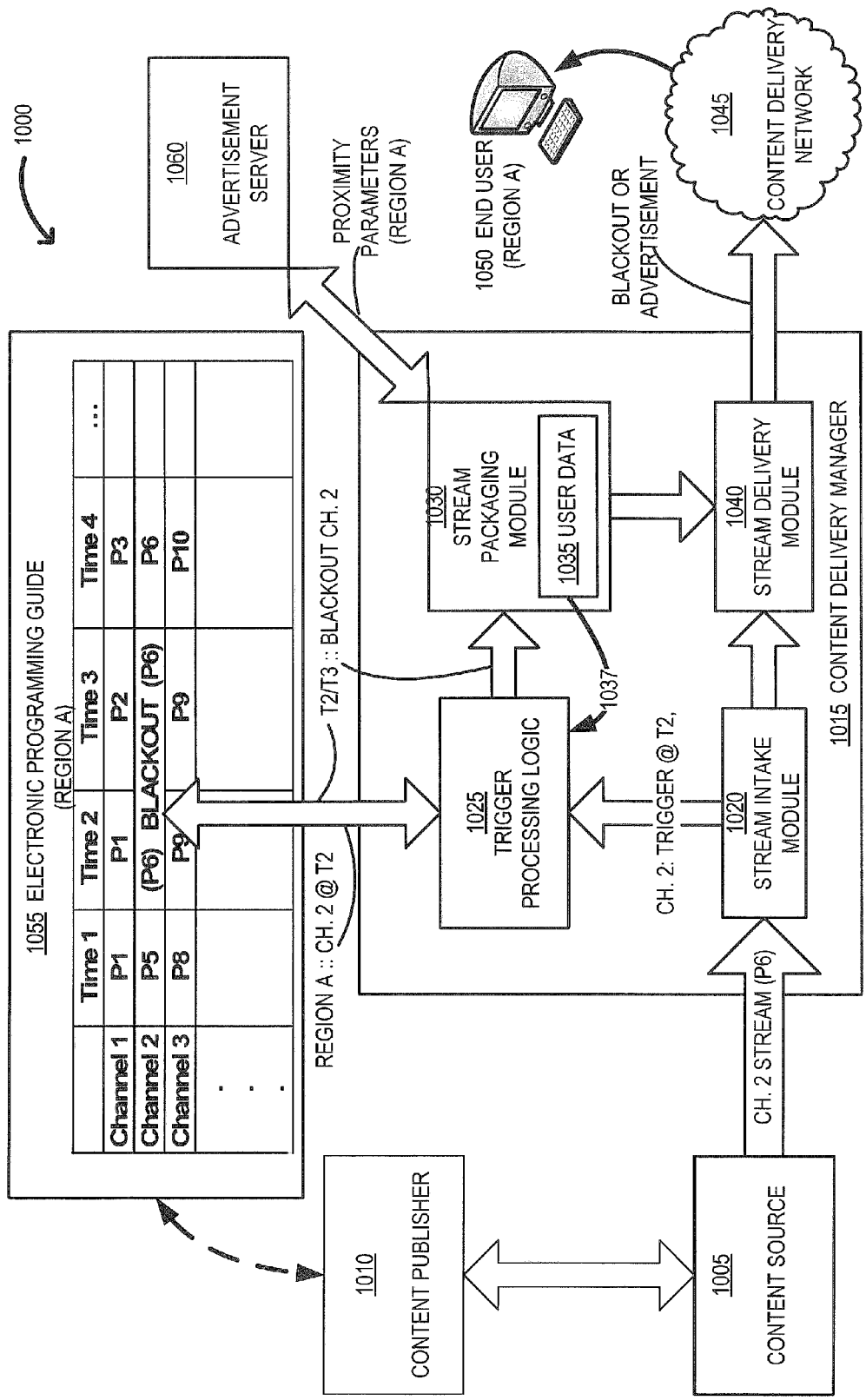
FIG. 10 is a block diagram of a network environment for providing content delivery management and administration in accordance with an example embodiment.

It should be noted that the content delivery manager 935 in FIG. 9, the content delivery manager 1015 in FIG. 10, and the content delivery manager 1150 (i.e., content delivery manager application 1150-1 and content delivery manager process 1150-2) in FIG. 11 each have the same or similar functionality, capabilities, and features as described with regard to their respective figures and embodiments.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

FIGS. 12-15 include flowcharts according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 12:
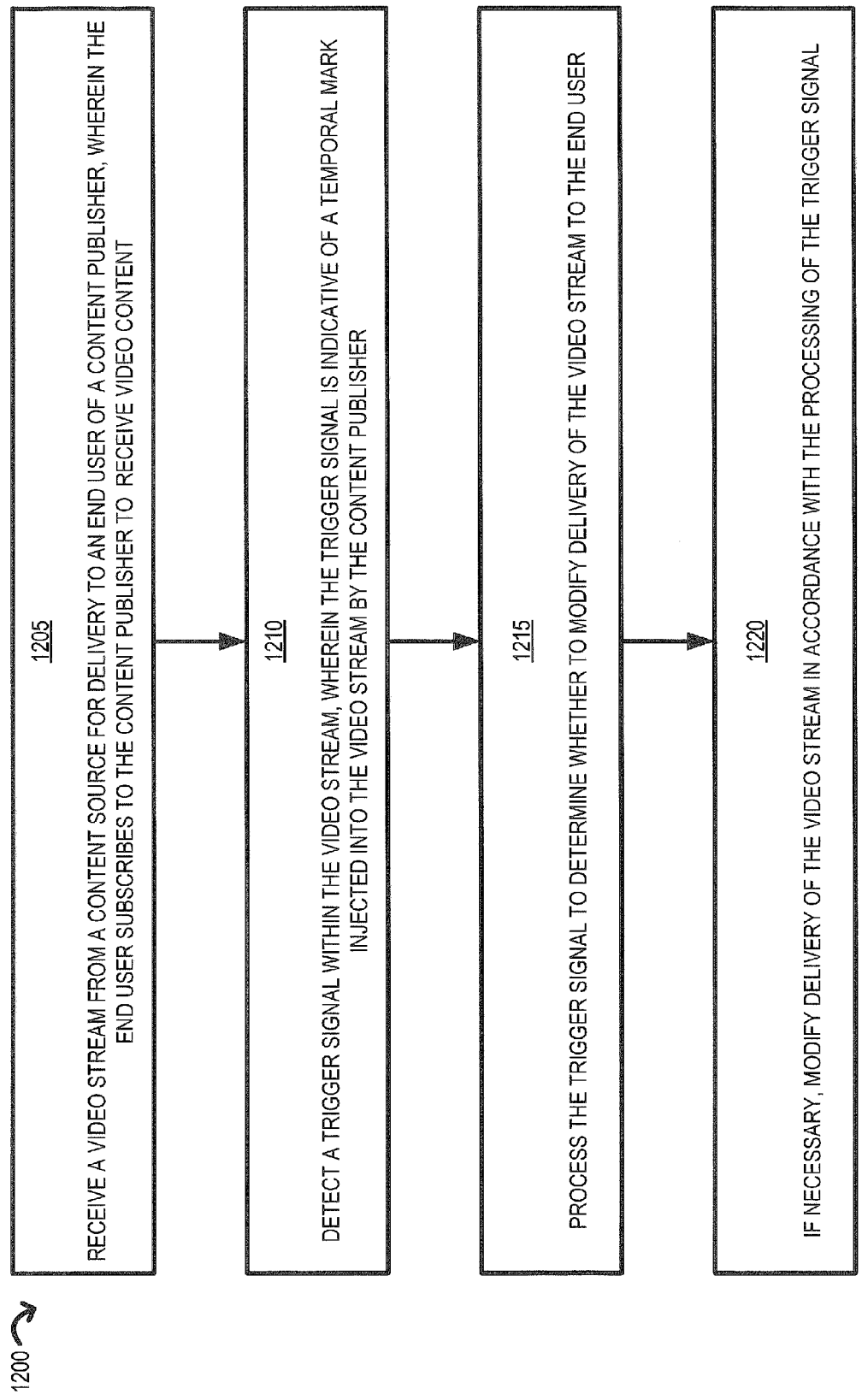
FIG. 12 is a block diagram of a computer system suitable for performing content delivery management and administration in accordance with an example embodiment.

Now, more specifically, FIG. 12 is a flow chart 1200 of processing steps that shows processing operations performed by the content delivery manager 1150 (i.e., content delivery manager application 1150-1 and/or the run-time implementation of content delivery manager process 1150-2) in accordance with one example embodiment.

In step 1205, the content delivery manager 1150 receives a video stream from a content source for delivery to an end user (e.g., client) of a content publisher. For example, the end user can subscribe to the content publisher to receive video content. In other words, the end user can log onto a content publisher's website (if the end user is a subscriber of the content publisher) to receive a live video stream from the content publisher as delivered by the content delivery manager 1150, according to one example embodiment.

In step 1210, the content delivery manager 1150 detects a trigger signal within the video stream. The trigger signal can be indicative of a temporal mark injected into the video stream by the content publisher (e.g., the trigger signal indicates that a commercial and/or advertisement should be inserted into the content stream). The trigger can also be injected into the video stream by an entity associated with content publisher. For example, in one embodiment the trigger signal is generated relative to the content source by a human associated with the content publisher.

In step 1215, the content delivery manager 1150 processes the trigger signal to determine whether to modify delivery of the video stream to the end user.

In step 1220, the content delivery manager 1150 modifies, if necessary, the delivery of the video stream in accordance with the processing of the trigger signal. For example, the content delivery manager 1150 can modify the video stream to include a commercial and/or advertisement.

Figure 13:
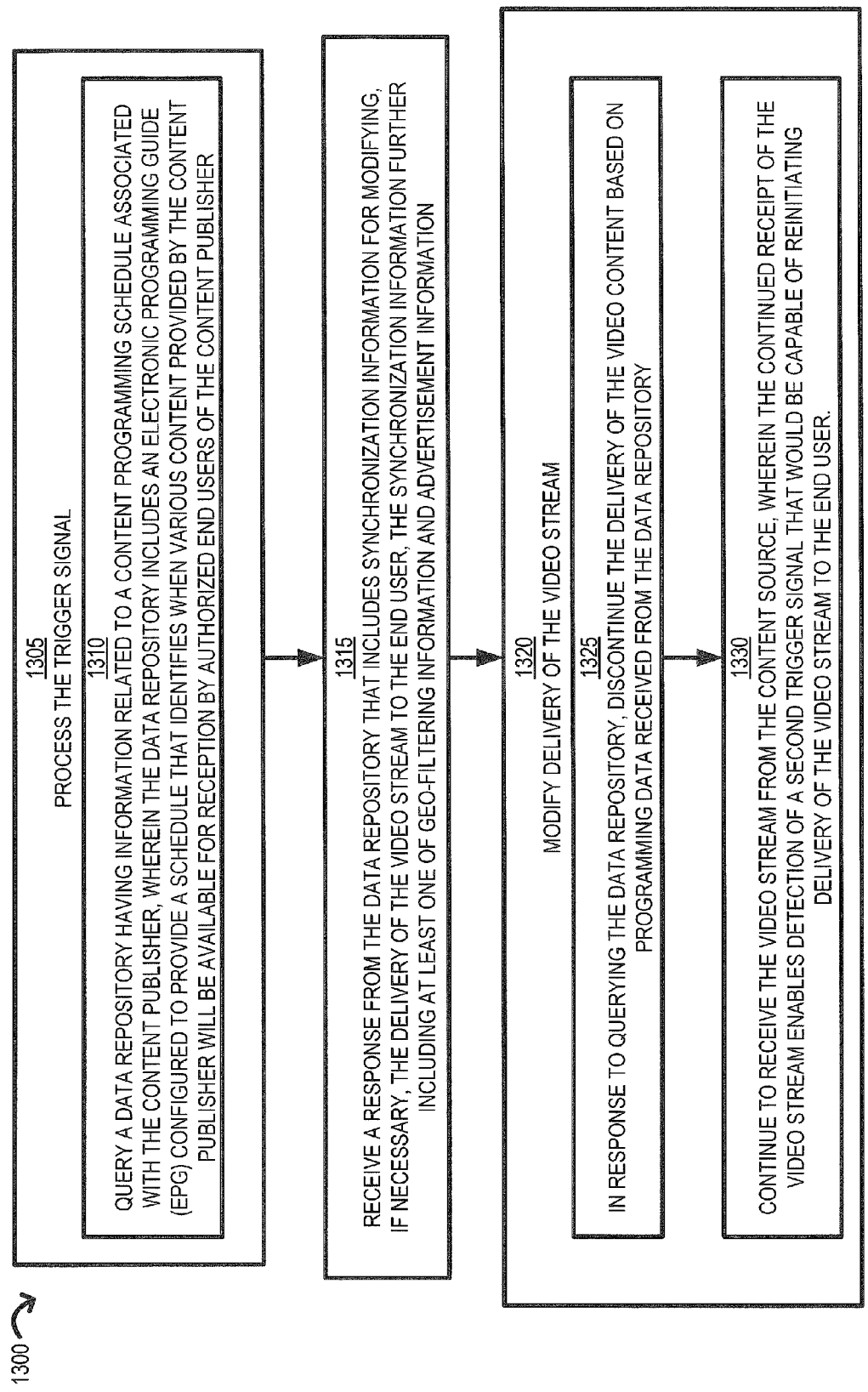
FIG. 13 is a flow chart that shows processing operations performed by a content delivery manager in accordance with an example embodiment.

FIG. 13 is a flow chart 1300 of processing steps that shows processing operations performed by the content delivery manager 1150 in accordance with one example embodiment.

In step 1305, the content delivery manager 1150 processes the trigger signal to determine whether to modify the video stream prior to being delivered to the end user(s).

In step 1310, the content delivery manager 1150 queries a data repository having information related to a content programming schedule associated with the content publisher. In an example embodiment, the data repository includes an Electronic Programming Guide (EPG) configured to provide a schedule that identifies when various content provided by the content publisher will be available for reception by authorized end users of the content publisher.

In step 1315, the content delivery manager 1150 receives a response from the data repository that includes synchronization information for modifying, if necessary, the delivery of the video stream to the end user. Additionally, the synchronization information can include geo-filtering information and/or advertisement information. For example, the geo-filtering information can include regions (e.g., related to IP addresses) to which the video content should not be delivered (or regions that are not authorized to receive delivery of the video stream). As its name suggests, the synchronization information can inform the content delivery manager 1150 when and how to modify the video stream, especially if the video stream is being delivered to the end user(s) in real-time.

In step 1320, the content delivery manager 1150 modifies delivery of the video stream (e.g., inserts a commercial, blacks out the video stream, etc.).

In step 1325, and in response to querying the data repository, the content delivery manager 1150 discontinues the delivery of the video content based on programming data received from the data repository (e.g., due to black out restrictions).

In step 1330, the content delivery manager 1150 continues to receive the video stream from the content source. In one embodiment, the continued receipt of the video stream enables the content delivery manager 1150 to detect a second trigger signal that would be capable of reinitiating delivery of the video stream to the end user (e.g., the trigger signal indicates that a commercial or black out time period has ended).

According to another example embodiment, the content delivery manager 1150 extracts synchronization information from the trigger signal. In this manner, the synchronization information indicates a type of event associated with the video stream and can specify temporal information relative to the detection of the trigger signal. The type of event can include, for example, an advertisement event, a program initiation event, a program termination event, etc. When the trigger signal includes supplemental information (e.g., trigger event type, time codes, etc.), the trigger processing logic of the content delivery manager 1150 can be disencumbered with the additional processing necessary to determine whether to modify delivery of the video stream as previously described and, as a result, may not necessarily have to communicate with external data sources such as the electronic programming guide (EPG).

Figure 14:
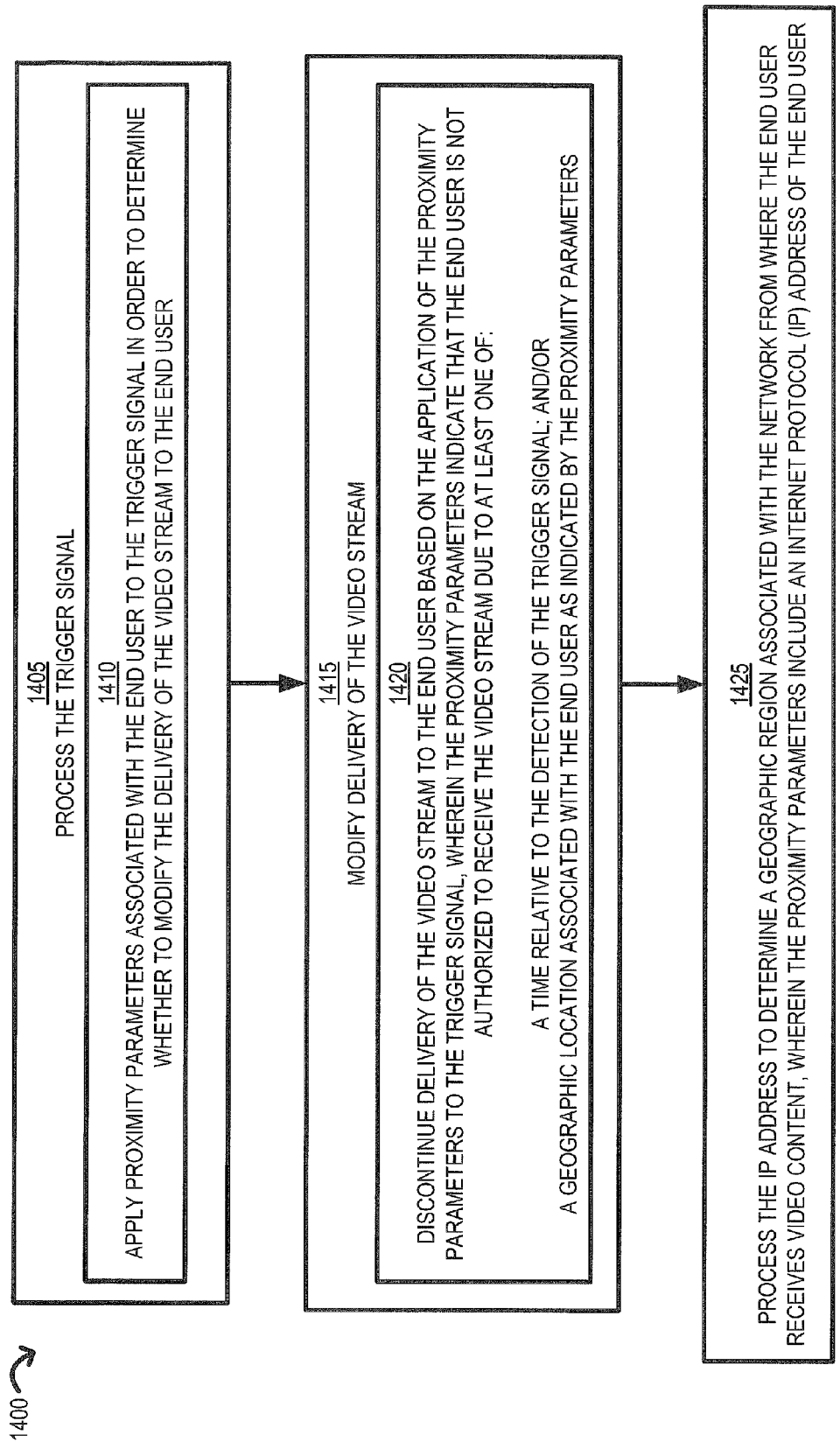
FIG. 14 is a flow chart that shows processing operations performed by a content delivery manager in accordance with an example embodiment

FIG. 14 is a flow chart 1400 of processing steps that shows processing operations performed by the content delivery manager 1150 in accordance with one example embodiment.

In step 1405, the content delivery manager 1150 processes the trigger signal to determine whether to modify, if necessary, delivery of the video stream.

In step 1410, the content delivery manager 1150 applies proximity parameters (e.g., IP addresses) associated with the end user to the trigger signal in order to determine whether to modify the delivery of the video stream to the end user.

In step 1415, the content delivery manager 1150 modifies delivery of the video stream.

In step 1420, the content delivery manager 1150 discontinues delivery of the video stream to the end user based on the application of the proximity parameters to the trigger signal. For example, the proximity parameters can indicate that the end user is not authorized to receive the video stream due to: i) a time relative to the detection of the trigger signal, and/or ii) a geographic location associated with the end user as indicated by the proximity parameters.

In step 1425, the content delivery manager 1150 processes the IP address to determine a geographic region associated with the network from where the end user receives video content.

Figure 15:
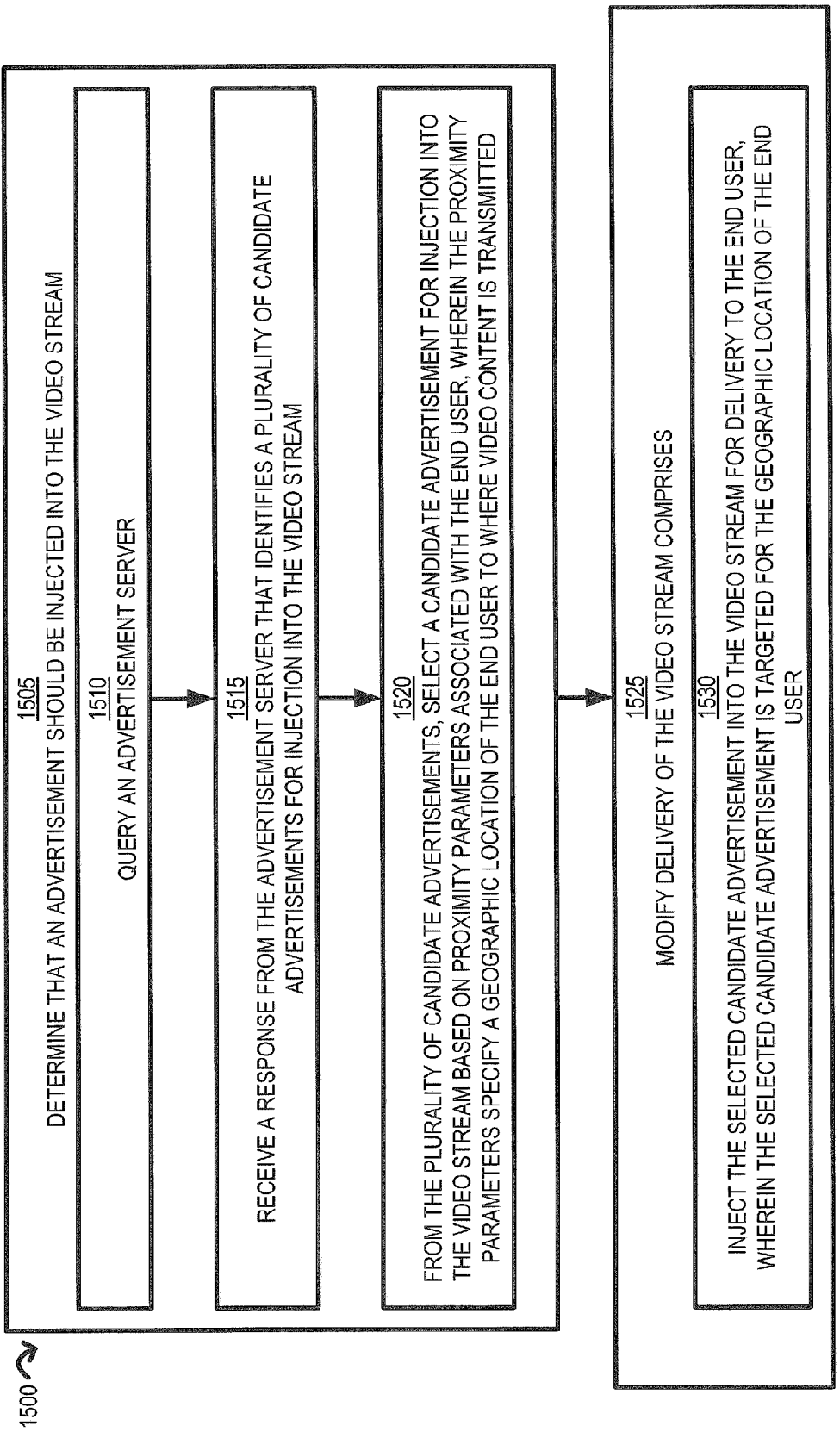
FIG. 15 is a flow chart that shows processing operations performed by a content delivery manager in accordance with an example embodiment

FIG. 15 is a flow chart 1500 of processing steps that shows processing operations performed by the content delivery manager 1150 in accordance with one example embodiment.

In step 1505, the content delivery manager 1150 determines that an advertisement should be injected into the video stream.

In step 1510, the content delivery manager 1150 queries an advertisement server.

In step 1515, the content delivery manager 1150 receives a response from the advertisement server that identifies a plurality of candidate advertisements for injection into the video stream.

In step 1520, the content delivery manager 1150 selects, from the plurality of candidate advertisements, a candidate advertisement for injection into the video stream based on proximity parameters associated with the end user. In this manner, the proximity parameters can specify a geographic location of the end user to where video content is transmitted.

In step 1525, the content delivery manager 1150 modifies delivery of the video stream.

In step 1530, the content delivery manager 1150 injects the selected candidate advertisement into the video stream for delivery to the end user. In one example embodiment, the selected candidate advertisement is targeted for the geographic location of the end user.

According to yet another example embodiment, the content delivery manager 1150 selects an advertisement to inject into the video stream based on information extracted from the trigger signal. For example, the selected advertisement can be targeted to a geographic location associated with the end user. In turn, the content delivery manager 1150 injects the selected advertisement into the video stream for delivery to the end user.

In accordance with another embodiment, the content delivery manager 1150 receives a video stream from a content source for delivery to a end user of a content publisher. The content source is associated with the content publisher in this particular example. Furthermore, the end user has been pre-authorized to receive video content from the content publisher.

During operation, the content delivery manager 1150 detects a trigger signal within the video stream. In this example embodiment, the trigger signal is indicative of a temporal mark injected into the video stream by a human associated with the content publisher. In response to detecting the trigger signal, the content delivery manager 1150 queries an Electronic Programming Guide (EPG) to determine whether to modify the delivery of the video stream to the end user. For purposes of example, the EPG can be configured to provide a schedule that identifies when various content provided by the content publisher will be available for reception by authorized end users of the content publisher.

Accordingly, the content delivery manager 1150 receives a response from the EPG that includes advertisement information and/or geo-filtering information. If necessary, the content delivery manager 1150 modifies delivery of the video stream to the end user in accordance with the advertisement information and/or the geo-filtering information.

System Operation: User Authentication

Figure 16:
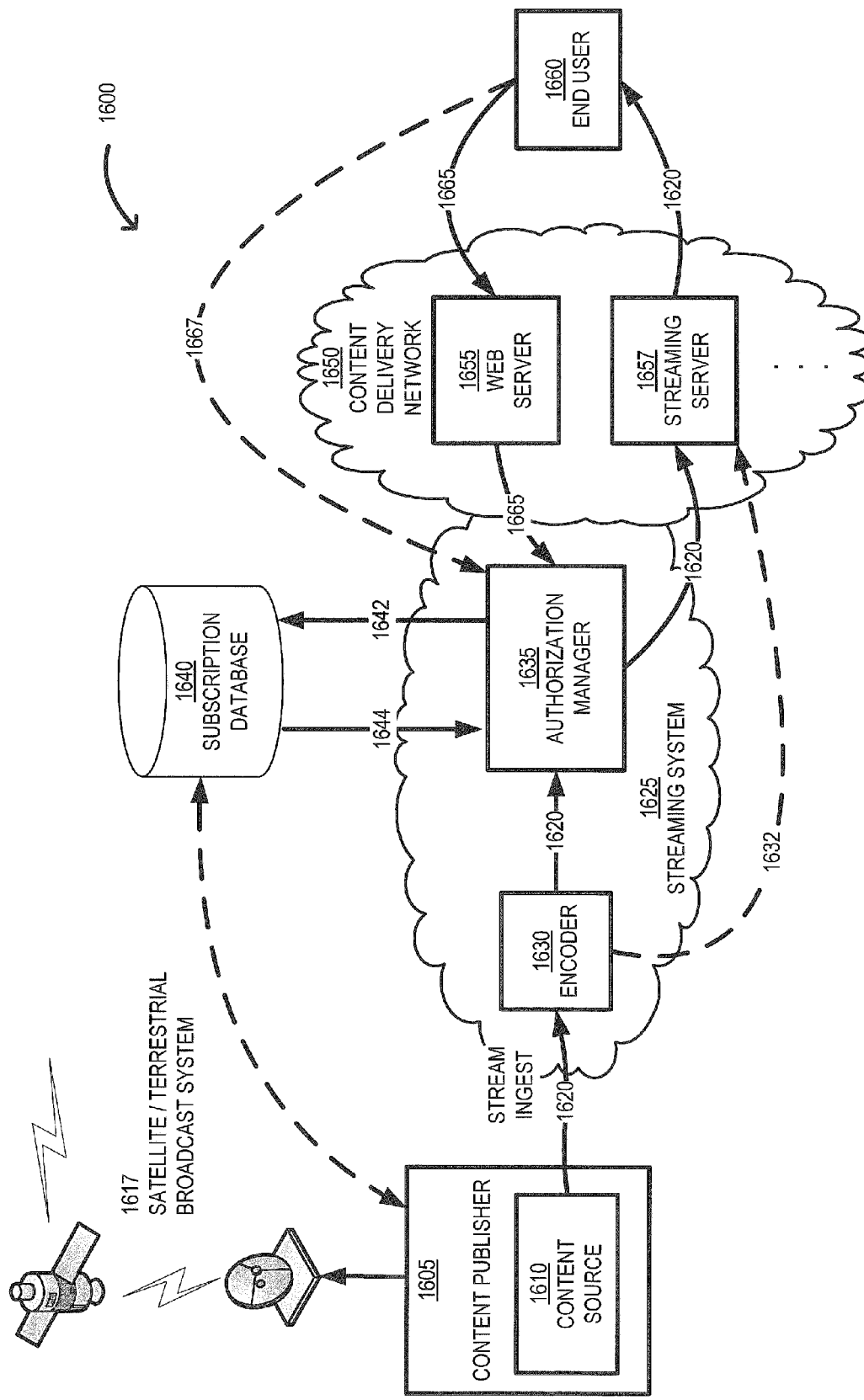
FIG. 16 is a block diagram of a network environment for providing end user authentication and authorization in accordance with an example embodiment.

Similar to the content delivery configuration previously described with respect to FIGS. 1-15, the example embodiment shown in FIG. 16 provides a method and system for content delivery across streaming system 925. FIG. 16 further depicts methods and systems for authenticating end users for delivery of video content by using pre-configured authentication information provided by a content publisher. The pre-configured authentication information can include subscription databases used by content publishers for authenticating users for non-Internet based delivery of video content (e.g., traditional broadcasts including satellite television, cable television, and the like).

For example, an authentication manager can "dip" into a subscriber's or content publisher's database to determine whether a given end user is authorized to receive certain content from the content publisher or broadcaster. This so-called "dipping" provides a seamless means for authenticating Internet end users to receive video content associated with a content publisher such that the content publisher does not have to create a new subscriber database for Internet end users or modify its already-established subscriber databases for traditional television end users (e.g., satellite and cable subscriber databases).

In particular, FIG. 16 is a block diagram of a network environment 1600 including a content publisher 1605 and associated content source 1610, satellite/terrestrial broadcast system 1617, streaming system 1625 including encoder 1630 and authorization manager 1635, subscription database 1640, and content delivery network 1650 (including web server 1655 and streaming server 1657) in communication with end user 1660.

Note that content publisher 1605 and content source 1610 have the same or similar configurations, relationships, and functionalities as the content publisher 905 and content source 910 previously described with respect to FIG. 9.

It should also be noted that satellite/terrestrial broadcast system 1617 has the same or similar configurations, functionalities, and features as satellite/terrestrial broadcast system 920 previously discussed with respect to FIG. 9. Satellite/terrestrial broadcast system 1617 may also provide cable television distribution means for delivering video content to end users.

During general operation, the content source 1610 (e.g., via content publisher 1605) distributes a content stream 1620 (e.g., audio stream, video stream, etc.) into streaming system 1625 at the stream ingest. The content stream 1620 may be contain live content, such as a sporting event, for real-time (or near real-time) distribution to end users across streaming system 1625 and content delivery network 1650. Note that video streams 160 may also be stored and cached for on-demand type distribution.

Similar to the encoder 930 described with respect to FIG. 9, encoder 1630 provides real-time encoding of the content stream 1620 and can include Real encoding, QT encoding, WM encoding, and the like (see FIG. 2). After being encoded at the encoder 1630, the video stream 1620 is transmitted within the streaming system 1625 to content delivery manager 1635. In one example configuration, the content stream 1620 is propagated downstream through the streaming system 1625 (and possibly the content delivery network 1650) using RTSP (Real Time Streaming Protocol). In such a configuration, the actual audio/video data contained in the content stream 1620 may be distributed downstream using RTP (Real-time Transport Protocol).

Referring still to the example embodiment of FIG. 16, the authorization manager receives the content stream 1620 for distribution to end user 1660. Prior to transmitting the content stream 1620 downstream to end user 1660 (via content delivery network 1650), the authorization manager 1635 determines whether end user 1660 is authorized to receive the content stream 1620.

Note that the authorization manager 1635 supports functionality for both streaming and authentication/authorization services, as shown in the example embodiment of FIG. 16. However, the authorization manager 1635 does not necessarily have to provide streaming services and, as such, may only provide authentication/authorization services. For example, upon authenticating/authorization by authorization manager 1635, the encoder 1630 may bypass the authorization manager 1635 and transmit the content stream 1620 to content delivery network 1650 for delivery to end user 1660, as shown by the perforated arrow 1632. The content stream 1620 may also pass through another entity (e.g., content delivery manager 935, 1015, and/or 1150) suitable for managing and administering delivery of video content in streaming system 1625.

To authorize/authenticate end user 1660 for delivery of content stream 1620, the authorization manager 1635 first receives an authorization request 1665 from end user 1660. For example, in one embodiment the authorization manager 1635 receives the authorization request 1665 from end user 1660 via web server 1655 of content delivery network 1650. In another embodiment, the end user 1660 sends an authorization request 1667 (as shown by the perforated arrow) directly to authorization manager 1635.

Note that, similar to the example embodiment of FIG. 9, web server 1655 provides front-end interaction with end user 1660 by serving web pages, initiating registration/logon services, providing e-commerce and transactional payment capabilities, and the like. In particular, web server 1655 provides authorization/authentication services in its interaction with authorization manager 1635 in accordance with the example embodiment of FIG. 16.

As its name suggests, streaming server 1655 typically provides back-end streaming services by delivering, for example, the content stream 1620 as provided by either authorization manager 1635 and/or encoder 1630. Note that the vertical ellipses in content delivery network 1650 indicate that there can be multiple web and/or streaming servers associated with content delivery network 1650.

Having received the authorization request 1665 (or 1667) from end user 1660, the authorization manager 1635 communicates with ("dips" into) subscription database 1640 to determine whether end user 1660 is authorized to receive content stream 1620. As previously mentioned subscription database 1640 is associated with content publisher 1605 and provides subscription information related to various end users authorized to receive content from content publisher 1605. For example, subscription database 1640 may contain subscription information related to traditional satellite and/or cable television services provided by content publisher 1605. The authorization manager's 1635 interaction with subscription database 1640 is discussed in more detail below with respect to FIG. 17.

After verifying that the end user 1660 is authorized to receive the content stream 1620, the authorization manager 1635 initiates delivery of the content stream 1620 to end user 1660 via content delivery network 1650. The content stream 1620 can propagate downstream directly from encoder 1630 to content delivery network 1650, from encoder 1630 to authorization manager 1635 and then to content delivery network 1650, or from encoder 1630 to the content delivery network 1650 via another mechanism for managing delivery of content streams in streaming system 1625 (e.g., via content delivery manager 935, 1015, and/or 1150).

Figure 17:
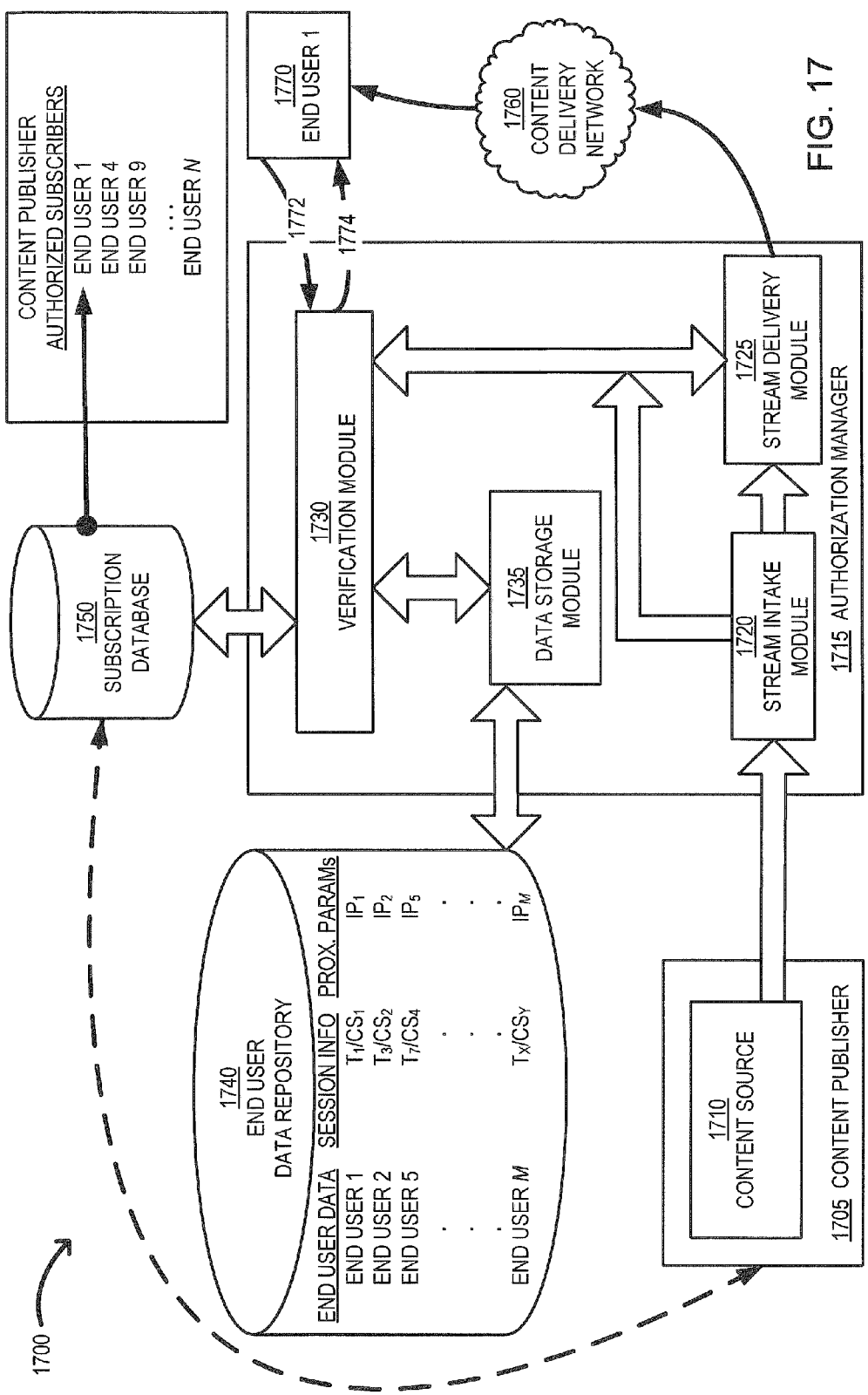
FIG. 17 is a block diagram of a network environment for providing end user authentication and authorization in accordance with an example embodiment.

FIG. 17 is a block diagram of a network environment 1700 including a content publisher 1705 and associated content source 1710, authorization manager 1715, data repository 1720, subscription database 1725, and content delivery network 1730 in communication with end user 1735. Authorization manager 1715 further includes data storage module 1740, verification module 1745, stream intake module 1750, and stream delivery module 1755.

Note that content publisher 1705 and content source 1710 have the same or similar configurations, relationships, and functionalities as the content publisher 905 and content source 910 previously described with respect to FIG. 9.

It should also be noted that the end user 1 1770 may communicate directly with the verification module 1730 of authorization manager 1715 or, alternatively, the end user 1 1770 may communicate with verification module 1730 via a web server (e.g., web server 1655) associated with content delivery network 1760.

During operation, the stream intake module 1720 of authorization manager 1715 receives a content stream (e.g., video stream) from content source 1710 and/or content publisher 1705. Upon receiving the content stream, the stream intake module 1720 checks with the verification module 1730 to determine whether end user 1 1770 is authorized to receive the content stream.

The stream intake module 1720 passes the content stream through to stream delivery module 1725 so that the content stream can be delivered (via content delivery network 1760) to end user 1 1770 upon authorization/authentication by verification module 1730. Note that the verification module 1730 may notify either the stream intake module 1720 and/or the stream delivery module 1725 of the authorization status of end user 1 1770. If, for example, the verification module 1730 notifies the stream intake module 1720 that end user 1 1770 is authorized to receive the content stream, the stream intake module 1720 passes the content stream to stream delivery module 1725 for unfettered content stream delivery to end user 1 1770 via content delivery network 1760.

In the example embodiment of FIG. 17, the authorization manager 1715 authorizes/authenticate end user 1 1770 (via verification module 1730) prior to receiving the content stream from content source 1710 (and/or content publisher 1705) so that the stream delivery module 1725 may deliver the content stream to end user 1 1770 with further authorization processing by verification module 1730. According to another example embodiment, the end user 1 1770 may be verified on-the-fly as the content stream is received by the authorization manager 1715 such that the content stream is received by the stream intake module 1720 prior to end user authorization.

It should be noted that, in the example embodiment of FIG. 17, the authorization manager 1715 is shown with a stream intake module 1720 and stream delivery module 1725. According to additional embodiments, the authorization manager 1715 does not include such streaming capabilities and would not process the actual content stream as provided by the content source 1710 and/or content publisher 1705. Instead, the authorization manager 1715 would provide authentication/authorization services and then, upon verification, the authorization manager 1715 would initiate delivery of the content stream to end user 1 1770 via another entity, such as content delivery manager 935, 1015, and/or 1150.

The verification module 1730 can initiate authorization of end user 1 1770 by either receiving a request for authorization 1772 from end user 1 1770, or by proactively soliciting a request for authorization 1774 (or soliciting information necessary to authorize end user 1 1770) if, for example, the content stream has already arrived at the authorization manager 1715.

According to an example embodiment, the verification module 1730 can first determine whether the end user 1 1770 is authorized to receive delivery of the content stream by querying local end user repository 1740 (via data storage module 1735). End user data repository 1740 is populated with subscription data for end users associated with authorization manager 1715. In this manner, the end user data repository 1740 is progressively updated with subscription data each time the verification module 1730 receives information from subscription database 1750.

For purposes of example only, the end user data repository 1740 stores both session information and proximity parameters related to each end user associated with authorization manager 1715. Note that the end user data repository 1740 may store different parameters and/or information related to each end user in addition to, or in lieu of the parameters and information shown in the example embodiment of FIG. 17.

The session information indicates that, for each applicable end user (end user 1, end user 2, end user 5, ... end user M), the authorization manager 1715 initiated delivery of a content stream ($CS_1$, $CS_2$, $CS_4$, $CS_Y$) at a respective time ($T_1$, $T_3$, $T_7$, ... $T_X$). Delivery of a specific content stream at a respective time represents a "session."

Still referring to the end user data repository 1740, the proximity parameters column indicates an Internet Protocol "IP" address associated with each applicable end user (e.g., end user 1=$IP_1$, end user 2=$IP_2$, end user 5=$IP_5$, ... end user M=$IP_M$). The proximity parameters may be used in furtherance of authenticating/authorizing an end user for purposes of geo-filtering/geo-blocking.

For example, assume that the end user data repository 1740 indicates that end user 1 1770 is already receiving content stream as part of an earlier-initiated session for that particular content stream. In one embodiment, the authorization manager 1715 can deny access to the end user 1 1770 since the end user had already requested delivery of that particular content stream as evidenced by the session information. By denying access in this manner, the authorization manager 1715 can prevent unscrupulous users (e.g., hackers, spoofers, etc.) from trying to gain unauthorized access to content streams.

Continuing with the same example, the authorization manager 1715 can alternatively grant the request by the end user 1 1770 to receive delivery of the content stream. In this manner, the authorization manager 1715 would terminate the earlier-initiated session and initiate a new session with end user 1 1770 for delivery of the content stream in accordance with the second request. By terminating the first session and initiating the second session, the authorization manager 1715 trusts that the second request is authentic (e.g., was actually sent by end user 1 1770) and that the first session with end user 1 1770 may have been prematurely disconnected or fallen victim to any number of network anomalies.

In response to receiving the request for authorization 1772, and now assuming that the end user data repository 1740 does not have information (an entry) related to end user 1 1770, the verification module 1730 queries subscription database 1750 to determine whether end user 1 1770 is authorized to receive delivery of the content stream. As shown, the subscription database contains a table of authorized subscribers (end user 1, end user 4, end user 9, ... end user N). Since end user 1 is listed as an authorized subscriber in subscription database 1750, the subscription database would indicate to verification module 1730 that end user 1 1770 is in fact authorized to receive delivery of the content stream.

Note that the subscription database 1750 associated with content publisher 1705 may only contain subscription information related to non-Internet services such as satellite television services, cable television services, and the like. As such, and in accordance with embodiments herein, the subscription database 1750 is capable of authorizing end user for web-based delivery of content such that the content publisher 1705 does not have to create (or modify existing) subscription database specific to Internet, or web-based services.

Figure 18:
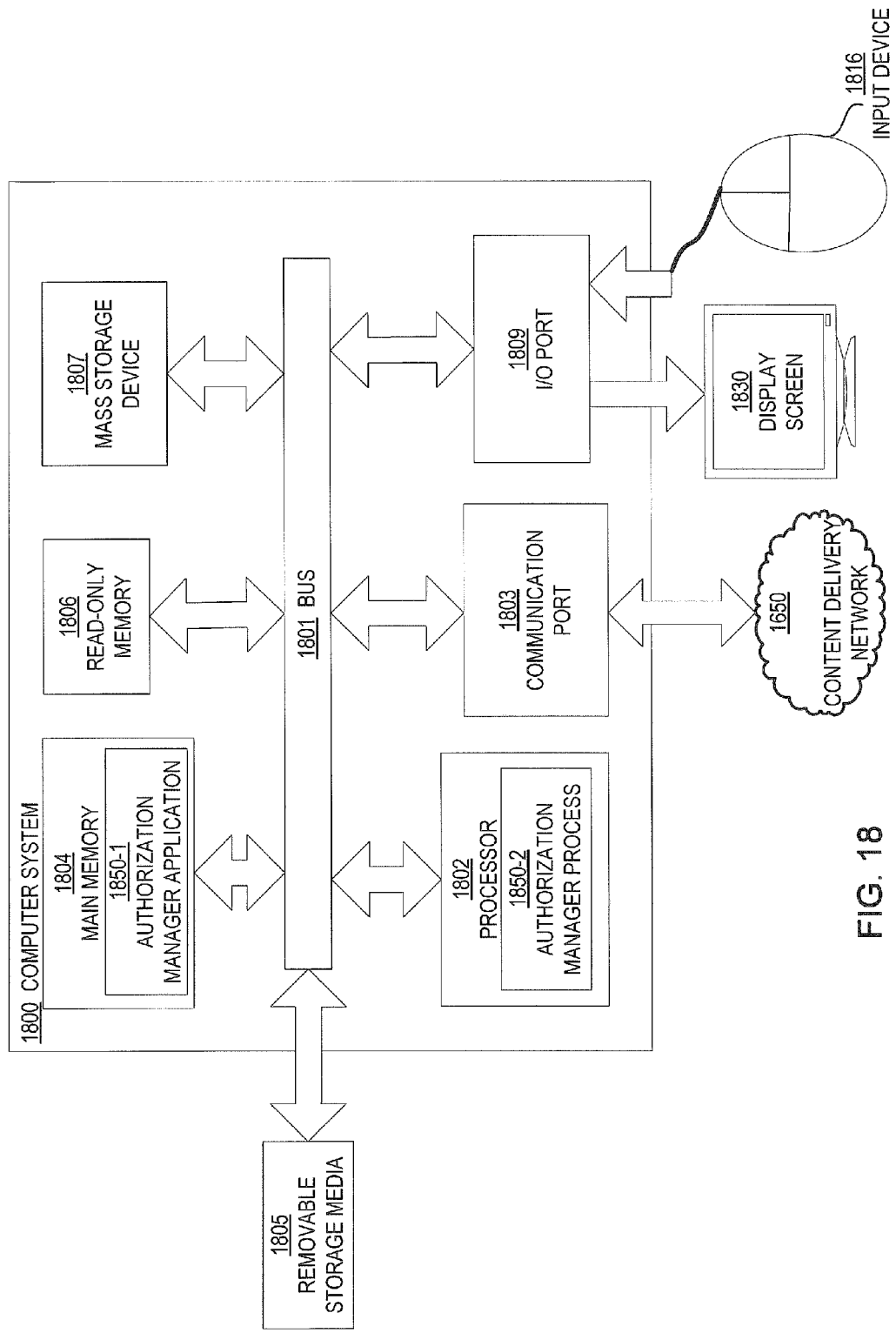
FIG. 18 is a block diagram of a computer system suitable for performing end user authentication and authorization in accordance with an example embodiment.

FIG. 18 is a schematic diagram of a computer system 1800 upon which embodiments of the present invention may be carried out and implemented. For example, one or more computing devices 1800 may be used to manage and/or administer the streaming of content across one or more networks (e.g., the Internet, content delivery networks (CDNs), and the like).

According to the present example, the computer system 1800 includes a bus 1801 (i.e., interconnect), at least one processor 1802, at least one communications port 1803, a main memory 1804, a removable storage media 1805, a read-only memory 1806, and a mass storage 1807. Processor(s) 1802 can be any known processor, such as, but not limited to, an Intel® Itanium® or Itanium 2® processor(s), AMD® Opteron® or Athlon MP® processor(s), or Motorola® lines of processors. Communications ports 1803 can be any of an RS-232 port for use with a modem based dial-up connection, a 10/100 Ethernet port, a Gigabit port using copper or fiber, or a USB port. Communications port(s) 1803 may be chosen depending on a network such as a Local Area Network (LAN), a Wide Area Network (WAN), or any network to which the computer system 100 connects (e.g., content deliver/network 950, 1045, 1650, and/or 1760). The computer system 1800 may be in communication with peripheral devices (e.g., display screen 1830, input device 1816) via Input/Output (I/O) port 1809.

Main memory 1804 can be Random Access Memory (RAM), or any other dynamic storage device(s) commonly known in the art. Read-only memory 1806 can be any static storage device(s) such as Programmable Read-Only Memory (PROM) chips for storing static information such as instructions for processor 1802. Mass storage 1807 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 101 communicatively couples processor(s) 1802 with the other memory, storage and communications blocks. Bus 1801 can be a PCI/PCI-X, SCSI, or Universal Serial Bus (USB) based system bus (or other) depending on the storage devices used. Removable storage media 1805 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 1804 is encoded with authorization manager application 1850-1 that supports functionality as discussed above and as discussed further below. Authorization manager application 1850-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 1802 accesses main memory 1804 via the use of bus 1801 in order to launch, run, execute, interpret or otherwise perform the logic instructions of the authorization manager application 1850-1. Execution of authorization manager application 1850-1 produces processing functionality in authorization manager process 1850-2. In other words, the authorization manager process 1850-2 represents one or more portions of the authorization manager application 1850-1 performing within or upon the processor(s) 1802 in the computer system 1800.

It should be noted that, in addition to the authorization manager process 1850-2 that carries out method operations as discussed herein, other embodiments herein include the authorization manager application 1850-1 itself (i.e., the un-executed or non-performing logic instructions and/or data). The authorization manager application 1850-1 may be stored on a computer readable medium (e.g., a repository) such as a floppy disk, hard disk or in an optical medium. According to other embodiments, the authorization manager application 1850-1 can also be stored in a memory type system such as in firmware, read only memory (ROM), or, as in this example, as executable code within the main memory 1804 (e.g., within Random Access Memory or RAM). For example, authorization manager application 1850-1 may also be stored in removable storage media 1805, read-only memory 1806, and/or mass storage device 1807.

In addition to these embodiments, it should also be noted that other embodiments herein include the execution of the authorization manager application 1850-1 in processor(s) 1802 as the authorization manager process 1850-2. Thus, those skilled in the art will understand that the computer system 1800 can include other processes and/or software and hardware components, such as an operating system that controls allocation and use of hardware resources.

It should be noted that the authorization manager 1635 in FIG. 16, the authorization manager 1715 in FIG. 17, and the authorization manager 1850 (i.e., authorization manager application 1850-1 and authorization manager process 1850-2) in FIG. 18 each have the same or similar functionality, capabilities, and features as described with regard to their respective figures and embodiments.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

FIGS. 19-22 include flowcharts according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 19:
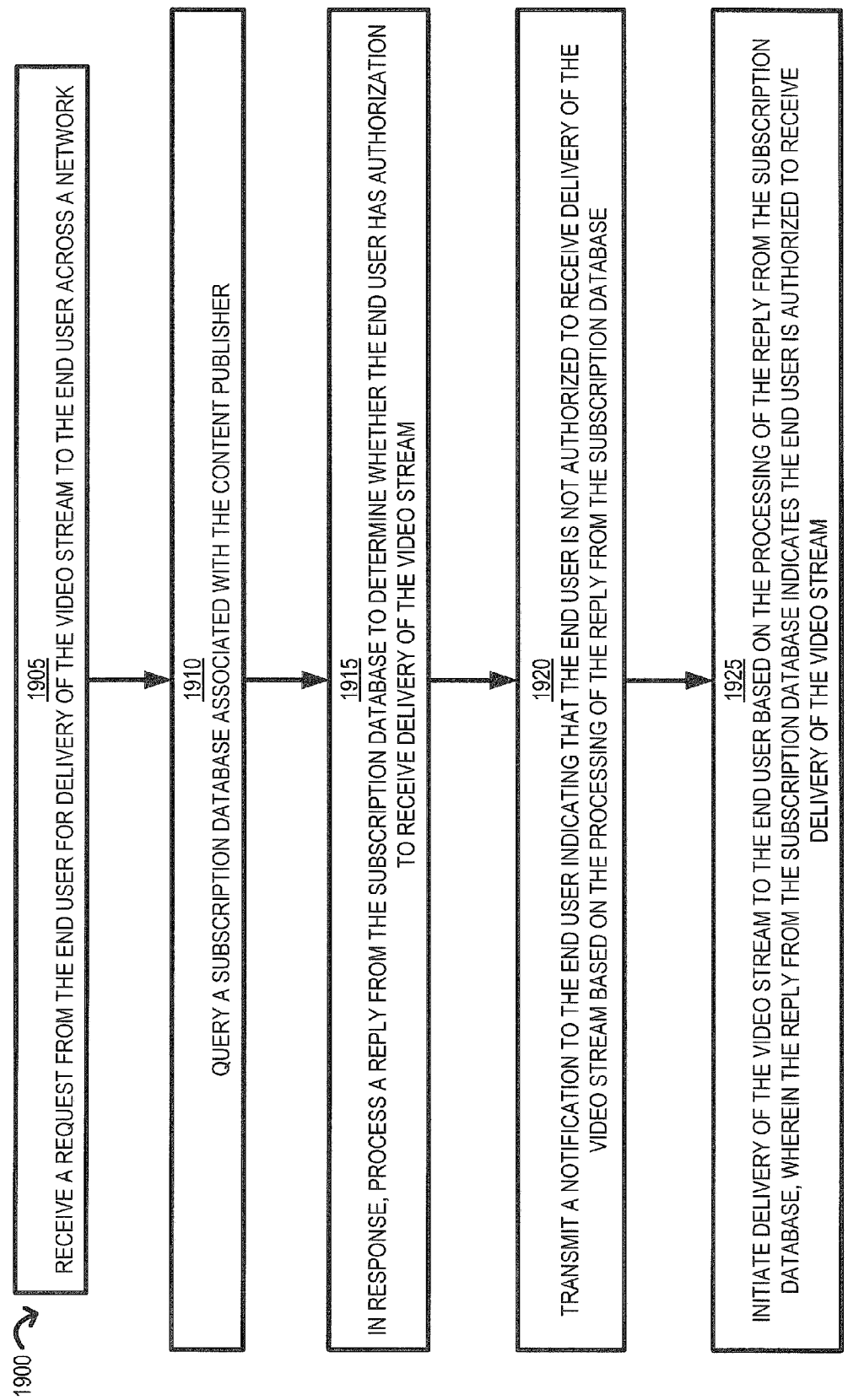
FIG. 19 is a flow chart that shows processing operations performed by an authorization manager in accordance with an example embodiment

Now, more specifically, FIG. 19 is a flow chart 1900 of processing steps that shows processing operations performed by the authorization manager 1850 (i.e., authorization manager application 1850-1 and/or the run-time implementation of authorization manager process 1850-2) in accordance with one example embodiment.

In step 1905, the authorization manager 1850 receives a request from the end user for delivery of the video stream to the end user across a network. For example, the request received from the user may be in response to a solicitation or request for authorization information previously sent to the end user.

In step 1910, the authorization manager 1850 queries a subscription database associated with the content publisher. For example, the subscription database may include subscription information related to traditional satellite television services, cable television services, and the like.

In step 1915, the authorization manager 1850 processes a reply from the subscription database to determine whether the end user has authorization to receive delivery of the video stream.

In step 1920, the authorization manager 1850 transmits a notification to the end user indicating that the end user is not authorized to receive delivery of the video stream based on the processing of the reply from the subscription database.

In step 1925, the authorization manager 1850 initiates delivery of the video stream to the end user based on the processing of the reply from the subscription database. The reply from the subscription database can indicate that the end user is authorized to receive delivery of the video stream. For instance, the end user may be authorized to receive delivery of the web-based video stream since the end user is already authorized to receive satellite and/or cable television services.

Figure 20:
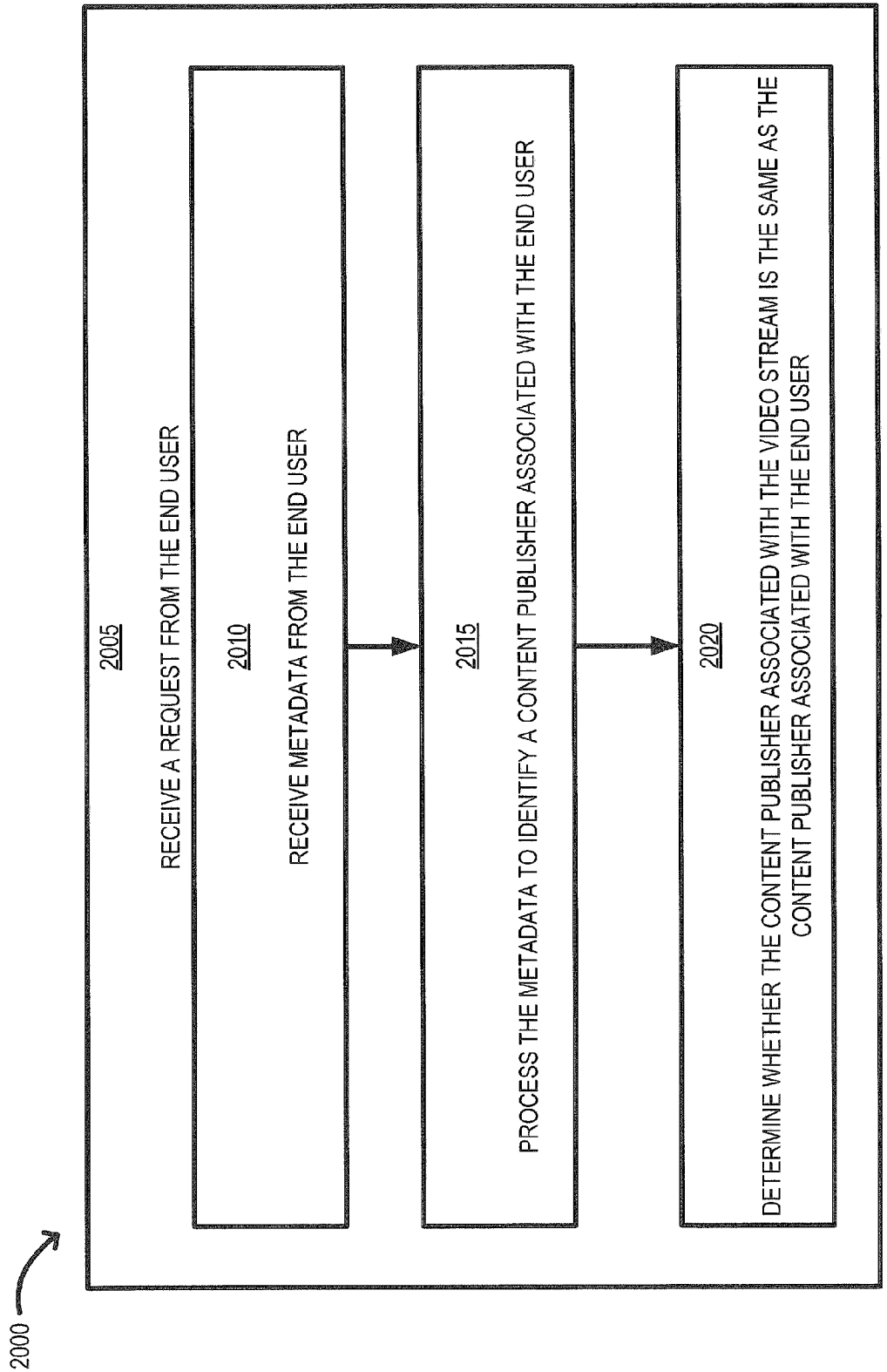
FIG. 20 is a flow chart that shows processing operations performed by an authorization manager in accordance with an example embodiment

FIG. 20 is a flow chart 2000 of processing steps that shows processing operations performed by the authorization manager 1850 in accordance with one example embodiment.

In step 2005, the authorization manager 1850 receives a request from the end user.

In step 2010, the authorization manager 1850 receives metadata from the end user (e.g., token, cookie, etc.). For example, the end user may have received the token and/or cookie from a third party authorization service associated with the content publisher. In this manner, the authorization manager 1850 does not necessarily have to query a subscription database to determine whether the end user is authorized to receive delivery of the video stream.

In step 2015, the authorization manager 1850 processes the metadata (e.g., cookie and/or token) to identify a content publisher associated with the end user.

In step 2020, the authorization manager 1850 determines whether the content publisher associated with the video stream is the same as the content publisher associated with the end user. For example, if it is determined from the metadata (e.g., token and/or cookie) that the end user is already authorized to receive delivery of content from the content publisher associated with the video stream, then the authorization manager 1850 initiates delivery of the content stream to the end user.

Figure 21:
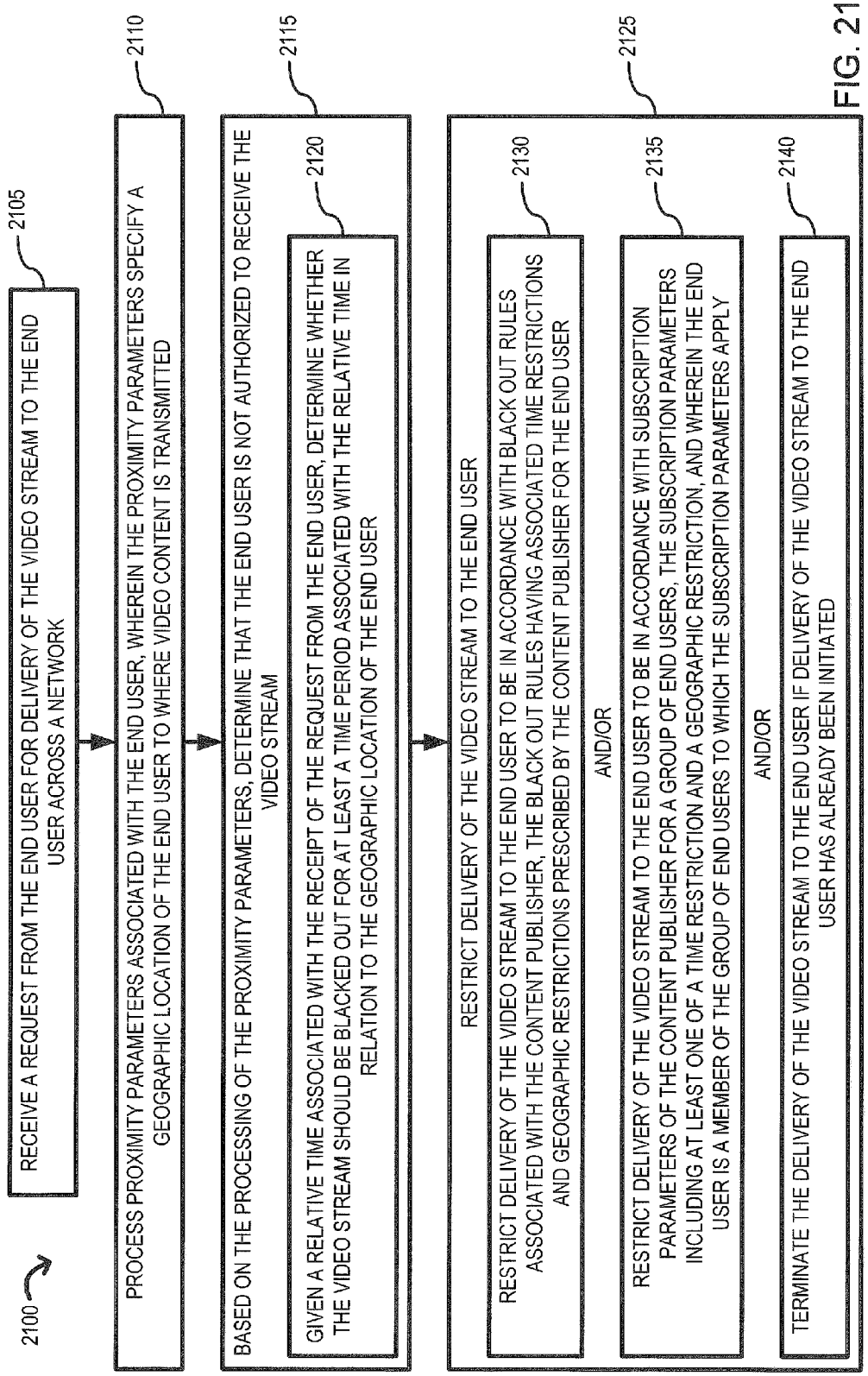
FIG. 21 is a flow chart that shows processing operations performed by an authorization manager in accordance with an example embodiment

FIG. 21 is a flow chart 2100 of processing steps that shows processing operations performed by the authorization manager 1850 in accordance with one example embodiment.

In step 2105, the authorization manager 1850 receives a request from the end user for delivery of the video stream to the end user across a network.

In step 2110, the authorization manager 1850 processes proximity parameters associated with the end user. For example, the proximity parameters can specify a geographic location of the end user to where video content is transmitted.

In step 2115, the authorization manager 1850 determines that the end user is not authorized to receive the video stream. Such a determination can be based on the processing of the proximity parameters (e.g., as part of a geo-filtering and/or geo-blocking regime).

In step 2120, and given a relative time associated with the receipt of the request from the end user, the authorization manager 1850 determines whether the video stream should be blacked out for at least a time period associated with the relative time in relation to the geographic location of the end user.

In step 2125, the authorization manager 1850 restricts delivery of the video stream to the end user.

In step 2130, the authorization manager 1850 restricts delivery of the video stream to the end user in accordance with black out rules associated with the content publisher. In this manner, the black out rules have associated time restrictions and geographic restrictions prescribed by the content publisher for the end user.

In step 2135, the authorization manager 1850 restricts delivery of the video stream to the end user in accordance with subscription parameters of the content publisher for a group of end users. For example, the subscription parameters can include a time restriction and/or a geographic restriction. Additionally, in this embodiment the end user is a member of the group of end users to which the subscription parameters apply.

In step 2140, the authorization manager 1850 terminates the delivery of the video stream to the end user if delivery of the video stream to the end user has already been initiated.

Figure 22:
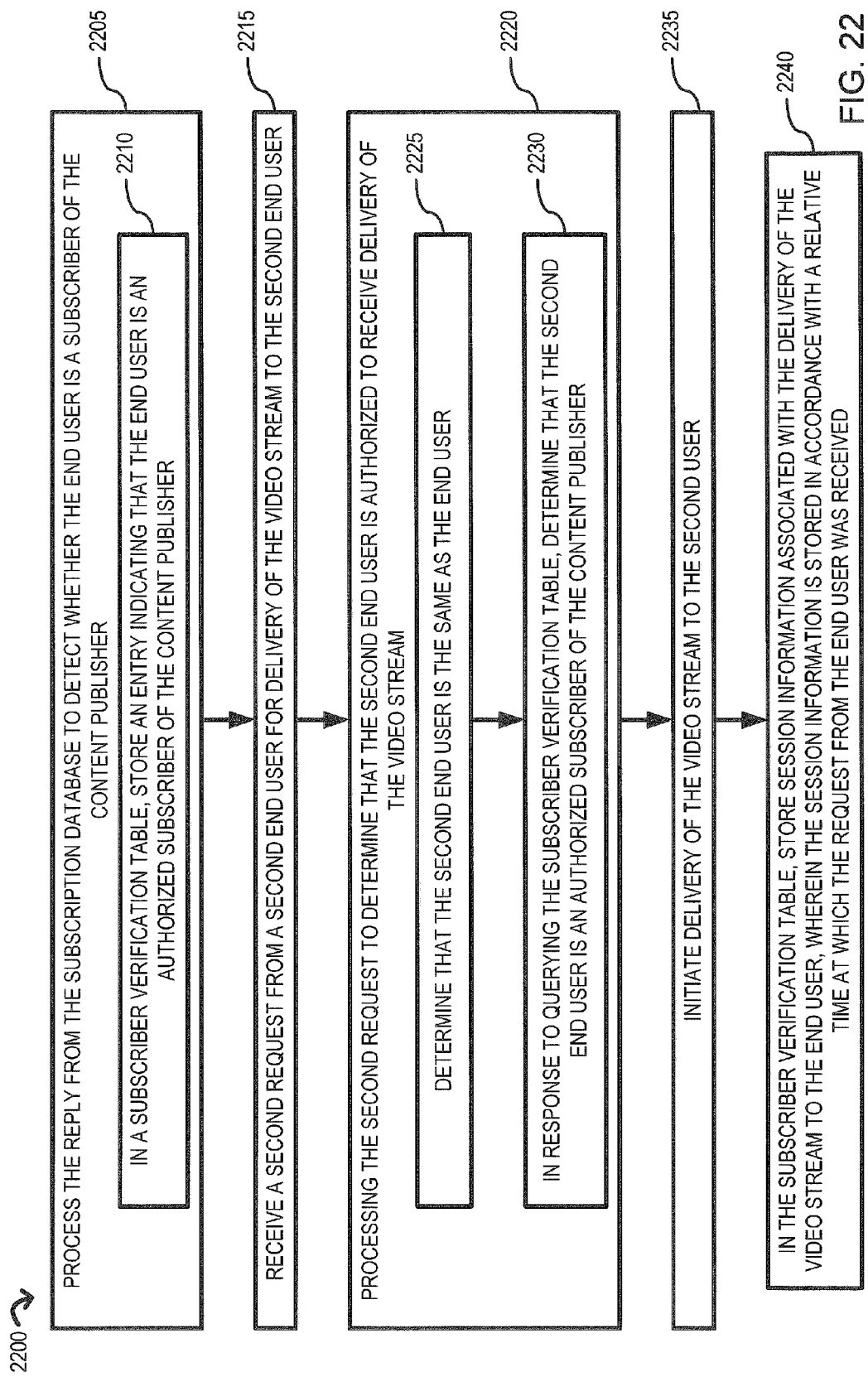
FIG. 22 is a flow chart that shows processing operations performed by an authorization manager in accordance with an example embodiment Throughout the drawing figures, like reference numerals will be understood to refer to like parts and components.

FIG. 22 is a flow chart 2200 of processing steps that shows processing operations performed by the authorization manager 1850 in accordance with one example embodiment.

In step 2205, the authorization manager 1850 processes the reply from the subscription database to detect whether the end user is a subscriber of the content publisher.

In step 2210, the authorization manager 1850 stores an entry in a subscriber verification table to indicate that the end user is an authorized subscriber of the content publisher. For instance, in one embodiment, the authorization manager 1850 analyzes a token and/or a cookie associated with the second request received from the second end user.

According to another embodiment, the authorization manager 1850 detects that the end user is not a subscriber of the content publisher. In such a scenario, the authorization manager 1850 stories an entry in the subscriber verification table to indicate that the end user is not an authorized subscriber of the content publisher. The authorization manager 1850 can also transmit a notification to the end user to indicate that the end user is not authorized to receive delivery of the video stream. As such, the authorization manager 1850 would specify in the notification that the end user is not an authorized subscriber of the content publisher from which the end user had requested delivery of the video stream.

In step 2215, the authorization manager 1850 receives a second request from a second end user for delivery of the video stream to the second end user.

In step 2220, the authorization manager 1850 processes the second request to determine that the second end user is authorized to receive delivery of the video stream.

In step 2225, the authorization manager 1850 determines that the second end user is the same as the end user. Such a determination is made so as to prevent unauthorized access to video streams by the unscrupulous users (e.g., hackers, spoofers, etc.).

In step 2230, and in response to querying the subscriber verification table, the authorization manager 1850 determines that the second end user is an authorized subscriber of the content publisher.

In step 2235, the authorization manager 1850 initiates delivery of the video stream to the second user. For example, the authorization manager 1850 may initiate delivery of the content stream to the end user via a content delivery network.

In step 2240, the authorization manager 1850 stores session information in the subscriber verification table. The session information is associated with the delivery of the video stream to the end user. Furthermore, the session information is stored in accordance with a relative time at which the request from the end user was received.

In accordance with another example embodiment, the authorization manager 1850 receives a request from the end user for delivery of the video stream to the end user across a network. In response, the authorization manager 1850 queries a subscription database associated with the content publisher and, then, processes a reply from the subscription database to determine whether the end user has authorization to receive delivery of the video stream.

As an example, if the end user is determined to have authorization to receive delivery of the video stream, the authorization manager 1850 creates an entry in a subscriber verification table specifying that the end user is an authorized subscriber of the content publisher. The entry can specify, for example, session information associated with delivery of the video stream to the end user. Furthermore, the session information is stored in accordance with a relative time at which the request from the end user was received. Having determined that the end user is authorized, the authorization manager 1850 initiates delivery of the video stream to the end user.

Although the present invention has been described with reference to various embodiments, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A computer-implemented method for authorizing delivery of a video stream to an end user, wherein the video stream is associated with a content publisher, the method comprising:
   receiving a request from the end user for delivery of the video stream to the end user across a network;
   querying a subscription database associated with the content publisher;
   in response, processing a reply from the subscription database to determine whether the end user has authorization to receive delivery of the video stream; and
   performing at least one of:
   transmitting a notification to the end user indicating that the end user is not authorized to receive delivery of the video stream based on the processing of the reply from the subscription database; and
   initiating delivery of the video stream to the end user based on the processing of the reply from the subscription database, wherein the reply from the subscription database indicates the end user is authorized to receive delivery of the video stream.

2. The computer-implemented method as in claim 1, wherein receiving a request from the end user comprises:
   receiving metadata from the end user;
   processing the metadata to identify a content publisher associated with the end user; and
   determining whether the content publisher associated with the video stream is the same as the content publisher associated with the end user.

3. The computer-implemented method as in claim 2, wherein the metadata is at least one of a token and a cookie.

4. The computer-implemented method as in claim 1 further comprising:

processing proximity parameters associated with the end user, wherein the proximity parameters specify a geographic location of the end user to where video content is transmitted;
based on the processing of the proximity parameters, determining that the end user is not authorized to receive the video stream; and
restricting delivery of the video stream to the end user.

5. The computer-implemented method as in claim 4, wherein determining that the end user is not authorized to receive the video stream comprises:
   given a relative time associated with the receipt of the request from the end user, determining whether the video stream should be blacked out for at least a time period associated with the relative time in relation to the geographic location of the end user.

6. The computer-implemented method of claim 4, wherein restricting delivery of the video stream to the end user is in accordance with black out rules associated with the content publisher, the black out rules having associated time restrictions and geographic restrictions prescribed by the content publisher for the end user.

7. The computer-implemented method of claim 4, wherein restricting delivery of the video stream to the end user is in accordance with subscription parameters of the content publisher for a group of end users, the subscription parameters including at least one of a time restriction and a geographic restriction, and wherein the end user is a member of the group of end users to which the subscription parameters apply.

8. The computer-implemented method as in claim 4, wherein restricting delivery of the video stream comprises:
   terminating the delivery of the video stream to the end user if delivery of the video stream to the end user has already been initiated.

9. The computer-implemented method as in claim 1, wherein processing the reply from the subscription database comprises detecting that the end user is not a subscriber of the content publisher, the method further comprising:
   in a subscriber verification table, storing an entry indicating that the end user is not an authorized subscriber of the content publisher, and
   wherein transmitting a notification to the end user indicating that the end user is not authorized to receive delivery of the video stream comprises:
   specifying in the notification that the end user is not an authorized subscriber of the content publisher from which the end user had requested delivery of the video stream.

10. The computer-implemented method as in claim 1, wherein processing the reply from the subscription database comprises detecting that the end user is a subscriber of the content publisher, the method further comprising:
    in a subscriber verification table, storing an entry indicating that the end user is an authorized subscriber of the content publisher.

11. The computer-implemented method of claim 10 further comprising:
    receiving a second request from a second end user for delivery of the video stream to the second end user;
    processing the second request to determine that the second end user is authorized to receive delivery of the video stream; and
    initiating delivery of the video stream to the second user.

12. The computer-implemented method of claim 11, wherein processing the second request to determine that the second end user is authorized to receive delivery of the video stream comprises:
- determining that the second end user is the same as the end user; and
- in response to querying the subscriber verification table, determining that the second end user is an authorized subscriber of the content publisher.

13. The computer-implemented method of claim 11, wherein processing the second request to determine that the second end user is authorized to receive delivery of the video stream includes analyzing at least one of a token and a cookie, wherein the at least one of a token and a cookie is associated with the second request received from the second end user.

14. The computer-implemented method of claim 10 further comprising:
- in the subscriber verification table, storing session information associated with the delivery of the video stream to the end user, wherein the session information is stored in accordance with a relative time at which the request from the end user was received.

15. A computer-implemented method for authorizing delivery of a video stream to an end user, the video stream being provided by a content source associated with a content publisher, the method comprising:
- receiving a request from the end user for delivery of the video stream to the end user across a network;
- querying a subscription database associated with the client publisher;
- in response, processing a reply from the subscription database to determine whether the end user has authorization to receive delivery of the video stream;
- if the end user is determined to have authorization to receive delivery of the video stream, creating an entry in a subscriber verification table specifying that the end user is an authorized subscriber of the content publisher, wherein the entry further specifies session information associated with delivery of the video stream to the end user, the session information being stored in accordance with a relative time at which the request from the end user was received; and
- initiating delivery of the video stream to the end user.

16. A system configured to authorize delivery of a video stream to an end user, wherein the video stream is associated with a content publisher, the system comprising:
- a network;
- a subscription database accessible via the network;
- a content server configured to receive a request from the end user for delivery of the video stream to the end user across the network;
- wherein the content server is configured to query the subscription database associated with the content publisher;
- wherein the content server is further configured to process a reply from the subscription database to determine whether the end user has authorization to receive delivery of the video stream; and
- wherein the content server is configured to perform at least one of:
  - transmitting a notification to the end user indicating that the end user is not authorized to receive delivery of the video stream based on the processing of the reply from the subscription database; and
  - initiating delivery of the video stream to the end user based on the processing of the reply from the subscription database, wherein the reply from the subscription database indicates the end user is authorized to receive delivery of the video stream.

17. The system as in claim 16 further comprising:
- proximity parameters associated with the end user, wherein the proximity parameters specify a geographic location of the end user to where video content is transmitted;
- wherein the content server is configured to process the proximity parameters to determine whether the end user is authorized to receive the video stream; and
- wherein a determination that the end user is not authorized to receive the video stream comprises:
- given a relative time associated with the receipt of the request from the end user, determining whether the video stream should be blacked out for at least a time period associated with the relative time in relation to the geographic location of the end user.

18. The system as in claim 17 further comprising:
- wherein the content server is configured to restrict delivery of the video stream to the end user in accordance with black out rules associated with the content publisher, the black out rules having associated time restrictions and geographic restrictions prescribed by the content publisher for the end user; and
- based on the black out rules, the content server is further configured to terminate the delivery of the video stream to the end user if delivery of the video stream to the end user has already been initiated.

19. The system as in claim 16 further comprising:
- a subscriber verification table;
- if the end user is determined to be an authorized subscriber of the content publisher, the content server is configured to store an entry in the subscriber verification table indicating that the end user is an authorized subscriber of the content publisher, wherein the entry further includes session information associated with the delivery of the video stream to the end user, the session information being stored in accordance with a relative time at which the request from the end user was received.

20. The system as in claim 16 further comprising:
- a subscriber verification table;
- if the end user is determined not to be an authorized subscriber of the content publisher, the content server is configured to store an entry in the subscriber verification table indicating that the end user is not an authorized subscriber of the content publisher, and
- wherein the content server is configured to specify in the notification that the end user is not an authorized subscriber of the content publisher from which the end user had requested delivery of the video stream.

* * * * *